United States Patent
Pillai et al.

(10) Patent No.: US 9,104,201 B1
(45) Date of Patent: Aug. 11, 2015

(54) METHOD AND APPARATUS FOR DYNAMIC SWARMING OF AIRBORNE DRONES FOR A RECONFIGURABLE ARRAY

(75) Inventors: Unnikrishna Sreedharan Pillai, Harrington Park, NJ (US); Alain Anthony Mangiat, Demarest, NJ (US)

(73) Assignee: C&P TECHNOLOGIES, INC., Closter, NJ (US)

( * ) Notice: Subject to any disclaimer, the term of this patent is extended or adjusted under 35 U.S.C. 154(b) by 851 days.

(21) Appl. No.: 13/372,081

(22) Filed: Feb. 13, 2012

(51) Int. Cl.
*G05D 1/00* (2006.01)

(52) U.S. Cl.
CPC ........ *G05D 1/0027* (2013.01); *B64C 2201/143* (2013.01)

(58) Field of Classification Search
CPC . B64C 2201/143; F41G 7/308; G05D 1/0027
See application file for complete search history.

(56) References Cited

U.S. PATENT DOCUMENTS

| | | | |
|---|---|---|---|
| 5,521,817 A | * | 5/1996 | Burdoin et al. ................... 701/3 |
| 5,728,965 A | * | 3/1998 | Fesland et al. ................. 89/1.11 |
| 6,926,233 B1 | * | 8/2005 | Corcoran, III .............. 244/76 R |
| 6,963,795 B2 | * | 11/2005 | Haissig et al. ..................... 701/7 |
| 8,781,727 B1 | * | 7/2014 | Bonawitz et al. ............. 701/422 |

OTHER PUBLICATIONS

"Mini, Micro, and Swarming Unmanned Aerial Vehicles: A Baseline Study" Nov. 2006, Patrick M. Miller.
Wall Street Journal, "More Drones Fewer Troops", "Military Plans Realignment: More Drones, Special Forces", Jan. 26, 2012.

* cited by examiner

*Primary Examiner* — Brian M O'Hara
(74) *Attorney, Agent, or Firm* — Walter J. Tencza, Jr.

(57) ABSTRACT

A method, system and apparatus to detect when one or more airborne unmanned aerial vehicles (drones) are close to each other, and to take necessary actions to maintain a minimum distance between drones as well as a maximum distance among the drones in a dynamic environment by automatic navigation. A computer method and apparatus for holding a group of drones in a swarm formation by maintaining the group centroid of the group of drones within a tolerance of a predetermined location is also disclosed. Additionally, methods to move a swarm of drones along a predetermined path while maintaining the swarm formation of the drones is also disclosed.

8 Claims, 16 Drawing Sheets

METHOD AND APPARATUS FOR DYNAMIC SWARMING OF AIRBORNE DRONES FOR A RECONFIGURABLE ARRAY

FIELD OF THE INVENTION

This invention relates to improved methods and apparatus for coordinating a group of airborne vehicles.

BACKGROUND OF THE INVENTION

Drones such as Unmanned Aerial Vehicles (UAVs) are increasingly used for various civilian and military missions. The use of drones are attractive when the operations are routine—search, rescue, and surveillance—such as border patrol, scouting for moving vehicles in remote areas, or when the mission poses a threat to human life, common in various military situations, or those encountered by law enforcement in the context of narcotics management and drug enforcement operations. Small drones are already being used for high speed road chases with local law enforcements, the platform is already used to chase and capture suspects in many states in the U.S. (Mini, Micro and Swarming Unmanned Aerial Vehicles: A Baseline Study, by Patrick Miller, Library of Congress, November 2006).

A recent article in The Wall Street Journal mentions the Pentagon's plans "to expand its global network of drones and special-operations bases in a fundamental realignment meant to project US power" (The Wall Street Journal, Thursday, Jan. 26, 2012, Page 1). The article goes on to describe the increasing importance of Combat Air Patrols (CAPs) commonly consisting of four US Drone Aircrafts such as the MQ-9 Reaper, dedicated to 24-hour 7-day-a-week presence in the sky and managed by a single pilot. Controlling individual drones within a CAP and similar operations in an autonomous fashion whereby routine tasks do not require human supervision is needed.

SUMMARY OF THE INVENTION

Bringing together a group of drones as a swarm whose flight operation is inspired by the flight path of flocking birds, swarming ants, and/or a swarm of fish as they move through the water looking for food is a major theme of the present patent application.

In order to have a successful swarming operation two main issues need to be resolved: (i) individual drones must be able to fly in the proximity of other drones, while avoiding collisions with other members of the group or swarm (collision avoidance), and (ii) the swarm of drones must be kept on its mission path. Keeping the swarm on its mission may include searching an area for law-enforcement type applications such as patrolling the ocean to detect drug smugglers, or traveling along a particular path as a group or swarm from one geo-location point marked "A" to another geo-location point designated on a map as "B".

In one or more embodiments of the present invention the proximity of swarm members is guaranteed by restricting the movement of the individual swarm members to be within a spherical region (swarm sphere) with a given center and a radius, such as five hundred meters. This can be accomplished by sensing the distances between each pair of drones in the group and requiring that the distance between any two drones never exceed the diameter of the swarm sphere. Furthermore, the concept of a swarm is reinforced, in at least one embodiment, by defining a concept of "a centroid of a group or swarm" of individual objects such as a group or swarm of drones or drones, and insisting that the group or swarm of drones can move around or within the swarm sphere without colliding into each other and while maintaining a spatially loosely-invariant "centroid of a group or swarm", meaning that the "centroid of the group or swarm" of drones, itself can move around within a small spherical region called the "group or swarm centroid sphere" whose radius can be specified in advance. For example, if the radius of the centroid swarm sphere is zero, then the "centroid of the group or swarm" i.e. of the drones as a group, is held completely rigid, i.e. in the same location relative to the swarm sphere center, whereas if the radius of the centroid sphere is set to a non-zero value, e.g. one meter, then the "centroid of the group or swarm" is allowed one meter freedom in its movement with respect to an initial position, and the group of drones are held loosely within the swarm sphere so as to hold the "centroid of the group" within a centroid sphere. The centroid may be replaced by the center-of-gravity whose computation involves the weight distribution of the drones. In either case, the goal is to introduce a quantity such as a centroid or a center-of-mass whose restricted motion imposes restrictions on the motion of the individual drones, thus allowing them to form a swarm.

In at least one embodiment, a swarm formation whose allowed centroid sphere radius is ten meters will not be as tightly held compared to one whose allowed centroid sphere radius is one meter. The swarm is not a rigid body in the conventional sense; nevertheless a "centroid of the group" or of the swarm of objects, can be determined in a manner similar for a centroid for a single rigid body. The centroid of a single rigid body is an invariant point with respect to the rigid body, whereas the centroid of the group or of the swarm doesn't maintain invariant distances with respect to the individual members in the swarm; moreover the centroid of the group itself is allowed some freedom in its location within a "group centroid sphere". The group centroid sphere can be defined in many ways. The group centroid sphere can be chosen so that the group or swarm centroid sphere has a center which coincides with a center of the swarm sphere. In that case, given a group centroid sphere radius, the swarm members move such that the distances between each of their centroids at various time instants and the swarm center is always less than the radius of the group or swarm centroid sphere. Another way to specify the group or swarm centroid sphere is to start with any well-defined swarm configuration and compute a first group centroid. This first group centroid is well defined with respect to the center of the swarm sphere. Any other allowable swarm configuration will have a new group centroid, i.e. a second group centroid different from the first, whose distance to the first group centroid is less than a radius of the group centroid sphere.

Path planning for the swarm formation is done in one or more embodiments of the present invention using the path that the swarm or group centroid must follow. This allows the swarm to travel as a flexible group while their group centroid follows a specified path.

A handheld computer or computer processor unit, such as an Android (trademarked) based platform tablet PC (personal computer) is used in at least one embodiment, as a ground coordinator to plan and execute each mission. The handheld tablet computer can locate and assemble the required drones at a specific location and then execute the "go" command for them to take off and regroup together as a swarm and fly to the final destination as a swarm. While in flight the swarm protocol takes over where each unit concentrates on collision avoidance while staying together as a swarm such that the group centroid of their present formation coincides with the pre-determined path coordinates.

One or more embodiments of the present invention relate to a computer method and apparatus for maintaining a reconfigurable airborne array using small drones and a handheld device for dynamic swarming.

One or more embodiments of the present invention provides a computer/micro-processor on board each drone which is programmed by computer software to create two virtual regions around each vehicle: one a smaller or inner or bubble region usually five to fifteen times the size of the drone, and the other a larger communications region, generally several hundred times the size of the inner region. These two virtual regions may be an inner bubble region such as an elliptical region or spherical region specified by a measure such as a radius centered around the drone, and an outer sphere (known as the communication sphere) of a larger radius (usually a half-mile to several miles). Both regions may be centered on each drone, completely envelope each drone and move along with each drone. Using small radar devices on board and other communication devices for a sensing, an on-board computer processor or micro-processor, on board each drone, is programmed by computer software to determine the distance and speed of all nearby drones within its communication circles and the computer processor or micro-processor is programmed to make necessary adjustments and corrections to its own speed and direction so that no other drones are allowed to enter its inner or bubble region. These corrections may include steering left or right, up or down, forwards or backwards, in prescribed steps, accelerating, decelerating, or a combination thereof, to keep a particular drone's inner bubble region free of any other drone or object. The above steps are done in a periodic manner when the drone is in motion in addition to all other routine operations associated with a drone in flight.

For all those drones that are equipped with similar swarming devices, the computer processors of the vehicles within the communication sphere are programmed to communicate with each other and a common pre-determined protocol as programmed by computer software will decide the combined movement of the drones involved in the swarm so as to maintain each of their inner bubble regions free of other drones and objects.

In another embodiment of the present invention, a handheld unit, such as an Android (trademarked) PC (personal computer) tablet, is used to coordinate the drones in the swarm by first deciding on a swarm sphere radius and its origin or center, then specifying the first location of the drones within this swarm sphere with respect to its origin, and computing a first group centroid location of the drones within the swarm sphere and translating this first group centroid location to the beginning point of the proposed path. The handheld device then charts out a path for the swarm to follow and executes the mission by making sure the coordinates of the group centroid of the swarm, at any period of time, matches with or very close to the coordinates of the planned path. This is done by making necessary adjustments to the drones in the swarm by the drones themselves and/or by use of the handheld personal computer (PC).

In another embodiment of the present invention sensors on the drones detect obstructions in the flight path and the onboard computer on each drone is programmed to initiate one or more of the following commands: move to the right, move to the left, move up, move down, move forwards, move backwards to avoid the object entering the inner region of the drone.

In another embodiment of the present invention drones across multiple communication spheres can swarm together if at least one drone is shared within each of the overlapping communication spheres. This drone acts as a relay to transfer relevant information for the swarm between the multiple communication spheres. All the members of the total swarm region may not be able to communicate directly with all the members of the swarm, but the intermediate drones acting as a relay allows for a total share of information across the swarm. Information such as the current geo-locations of each drone, which allows an overall first centroid location to be computed for all members within the swarm sphere, can be shared. The swarm members are loosely held within the swarm sphere such that the group centroid of the swarm members is allowed the freedom to roam inside a smaller sphere called the group centroid sphere centered at a first group centroid location. In this way, the swarm members are loosely held together while their overall group centroid has tighter restrictions for its movement.

In another embodiment of the present invention, a handheld personal computer (PC) computes a physical path where the beginning and end points of a desired path are entered in terms of the geographic location coordinates (such as latitude, longitude and altitude). The handheld personal computer (PC) then sketches out or computes a sequential path specified by subsequent geographic location coordinates by using a series of computer 3D (three-dimensional) maps of a region in between the starting and end coordinates. The maps chart out previously known obstructions such as hills, buildings, and power lines. The handheld personal computer, in at least one embodiment, then generates a path which avoids said interferences. The path will be specified by a sequence of latitude, longitude, and altitude coordinates that the swarm centroid must go through to complete its mission. This will be programmed into the computer processor and/or computer memory of each drone in the swarm as well. The computers or computer processors on board the handheld device and the drones are instructed to proceed from the initial location towards the final location in a sequential manner such that the swarm or group centroid coordinates in terms of its latitude, longitude and altitude are close to the path coordinates at every instant of a clock cycle. This is managed by dynamically computing the current group centroid location of the swarm and comparing it with the nearest pre-stored path coordinate. If the distance between the group centroid and any of the path coordinates is less than the allowed group centroid sphere radius, then no correction is required, otherwise corrections to the drone swarm are initiated so that the smallest distances between the group centroid and the path coordinate is reduced to be less than the allowed group centroid sphere radius. This procedure is done periodically as the synchronized clocks are updated both in the handheld personal computer (PC) and the swarm of drones.

In at least one embodiment of the present invention a method is provided, which includes controlling a flight of a first unmanned aerial vehicle and controlling a flight of a plurality of second unmanned aerial vehicles. The flight of the first unmanned aerial vehicle and the flight of the plurality of second unmanned aerial vehicles may be controlled so that each of the first unmanned aerial vehicle and the plurality of second unmanned aerial vehicles may be kept at least a first distance away from each of the other of the first unmanned aerial vehicle and the plurality of second unmanned aerial vehicles.

The flight of the first unmanned aerial vehicle and the flight of the plurality of second unmanned aerial vehicles may be controlled so that each of the first unmanned aerial vehicle and the plurality of second unmanned aerial vehicles is kept less than a second distance away from each of the other of the first unmanned aerial vehicle and the plurality of second unmanned aerial vehicles.

The flight of the first unmanned aerial vehicle may be controlled by controlling a direction in which the first unmanned aerial vehicle travels. The flight of each of the plurality of second unmanned aerial vehicles may be controlled by controlling a direction in which each of the plurality of second unmanned aerial vehicles travels. The flight of the first unmanned aerial vehicle may be controlled by controlling a speed at which the first unmanned aerial vehicle travels and/or a speed at which each of the plurality of second unmanned aerial vehicles travels.

The first unmanned aerial vehicle and the plurality of second unmanned aerial vehicles together may have a group centroid whose location varies with time as the first unmanned aerial vehicle and the plurality of second unmanned aerial vehicles move over time. The group centroid may be a geometric center of a collection of points including a first point associated with the first unmanned aerial vehicle, and a plurality of further points, one associated with each of the plurality of second unmanned aerial vehicles. The method may further include determining a first location of the group centroid at a first instant in time. The method may further include determining if the first location of the group centroid is within a tolerance distance of a first predetermined location.

In at least one embodiment, if the first location of the group centroid is not within the tolerance distance of the first predetermined location, the flight of one or more of the first unmanned aerial vehicle and the plurality of second unmanned aerial vehicles may be controlled so that a second location of the group centroid at a second instant in time is within the tolerance distance of the first predetermined location or a second predetermined location.

The first predetermined location and the second predetermined location may be located on a desired path. The difference between the first instant of time and the second instant of time may be a clock cycle time period. The method may include determining, at least once for every clock cycle time period, for a plurality of clock cycle time periods, whether the group centroid is within the tolerance distance of the next predetermined location on the desired path. If the group centroid is not within the tolerance distance of the next predetermined location on the desired path during a current clock cycle time period, the method may include controlling the flight of one or more of the first unmanned aerial vehicle and the plurality of second unmanned aerial vehicles so that the group centroid is within the tolerance distance of the next predetermined location on the desired path during a subsequent clock cycle time period occurring after the current clock cycle time period.

In at least one embodiment, the flight of the first unmanned aerial vehicle and the flight of the plurality of second unmanned aerial vehicles are controlled for a first period of time so that each of the first unmanned aerial vehicle and the plurality of second unmanned aerial vehicles is kept less than a second distance away from each of the other of the first unmanned aerial vehicle and the plurality of second unmanned aerial vehicles. In addition, the flight of the first unmanned aerial vehicle and the flight of the plurality of second unmanned aerial vehicles are controlled, in at least one embodiment, for a second period of time, following the first period of time, so that each of the first unmanned aerial vehicle and the plurality of second unmanned aerial vehicles is allowed to be more than the second distance away and is kept less than a third distance away from each of the other of the first unmanned aerial vehicle and the plurality of second unmanned aerial vehicles, wherein the third distance is greater than the second distance.

The method may also include determining a first location of the group centroid at a first instant in time during the first period of time; determining if the first location of the group centroid is within a tolerance distance of a first predetermined location; determining a second location of the group centroid at a second instant of time during the second period of time; and determining if the second location of the group centroid is within the tolerance distance of a second predetermined location.

In at least one embodiment, an apparatus is provided comprising a set of computer processors comprised of one or more computer processors; and a set of computer memories comprised of one or more computer memories. In at least one embodiment, the set of computer processors are programmed by a computer program stored in the set of computer memories to control a flight of a first unmanned aerial vehicle, and a flight of a plurality of second unmanned aerial vehicles, in a manner previous described.

The flight of the first unmanned aerial vehicle and the flight of the plurality of second unmanned aerial vehicles are controlled so that each of the first unmanned aerial vehicle and the plurality of second unmanned aerial vehicles is kept at least a first distance away from each of the other of the first unmanned aerial vehicle and the plurality of second unmanned aerial vehicles; and the first distance may be stored in one or more of the set of computer memories.

The flight of the first unmanned aerial vehicle and the flight of the plurality of second unmanned aerial vehicles are controlled so that each of the first unmanned aerial vehicle and the plurality of second unmanned aerial vehicles is kept less than a second distance away from each of the other of the first unmanned aerial vehicle and the plurality of second unmanned aerial vehicles; and the second distance may be stored in one or more of the set of computer memories.

The flight of the first unmanned aerial vehicle and/or each of the plurality of second unmanned aerial vehicles is controlled by controlling a direction in which the first unmanned aerial vehicle travels; and the direction or a value indicative of the direction may be stored in one or more of the set of computer memories. The flight of the first unmanned aerial vehicle and/or each of the second unmanned aerial vehicles is controlled by controlling a speed at which the first unmanned aerial vehicle travels; and the speed may be stored in one or more of the set of computer memories.

The set of computer processors may be programmed by computer programming stored in the set of computer memories to determine a first location of the group centroid at a first instant in time; and to determine if the first location of the group centroid is within a tolerance distance of a first predetermined location.

The set of computer processors may be programmed by computer programming stored in the set of computer memories, so that if the first location of the group centroid is not within the tolerance distance of the first predetermined location, the set of computer processors controls the flight of one or more of the first unmanned aerial vehicle and the plurality of second unmanned aerial vehicles so that a second location of the group centroid at a second instant in time is within the tolerance distance of the first predetermined location or a second predetermined location.

The first predetermined location and the second predetermined location may be located on a desired path. The difference between the first instant of time and the second instant of time is a clock cycle time period which is determined by the set of computer processors. The set of computer processors may be programmed by computer programming stored in the set of computer memories to determine, at least once for every clock cycle time period, for a plurality of clock cycle time periods, whether the group centroid is within the tolerance distance of the next predetermined location on the desired path. The tolerance distance can be stored in one or more of the set of computer memories.

The set of computer processors may be programmed by computer programming stored in the set of computer memories, so that if the group centroid is not within the tolerance distance of the next predetermined location on the desired path during a current clock cycle time period, the set of computer processors controls the flight of one or more of the first unmanned aerial vehicle and the plurality of second unmanned aerial vehicles so that the group centroid is within the tolerance distance of the next predetermined location on the desired path during a subsequent clock cycle time period occurring after the current clock cycle time period.

DETAILED DESCRIPTION OF THE DRAWINGS

Figure 1:
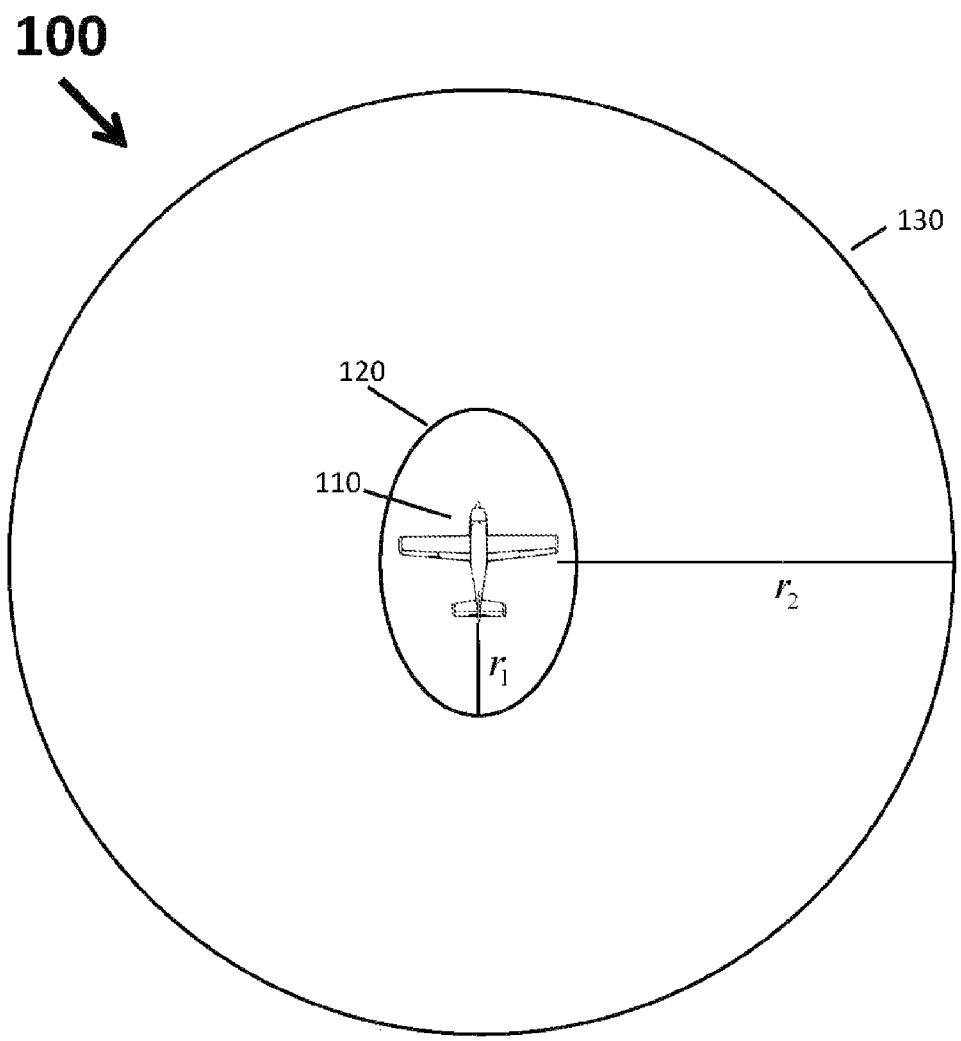
FIG. 1 illustrates a moving drone with its inner bubble region and outer communication region shown.

FIG. 1 illustrates a diagram 100 of a drone 110 with inner "bubble" region 120 and communication sphere 130. The drone 110 may be an unmanned aerial vehicle (UAV). The inner bubble region 120 may be spheroidal or ellipsoidal with radius $r_1$, which may be for example ten to fifteen times the size of the drone. The communication sphere 130 with radius $r_2$ may be a fraction of a kilometer to a kilometer and is determined by the type of sensor devices and frequency bands used for communication. The center the region 120 and the sphere 130 may coincide with either the centroid or the center of mass of the drone 110. Each drone, such as drone 110, has a computer processor, such as drone computer processor 1410 in FIG. 14, which maintains the particular drone's bubble region, such as bubble region 120 for drone 110, free of other drones and objects. Each drone, such as 110, has a computer processor, such as 1410 for drone 110, which is programmed to allow the drone 110 to communicate with all other drones that are within its communication sphere, such as communication sphere 130 for drone 110 in FIG. 1. Thus drone 110 keeps region 120 free of other drones and communicates with all other drones within its communication sphere 130.

Figure 2:
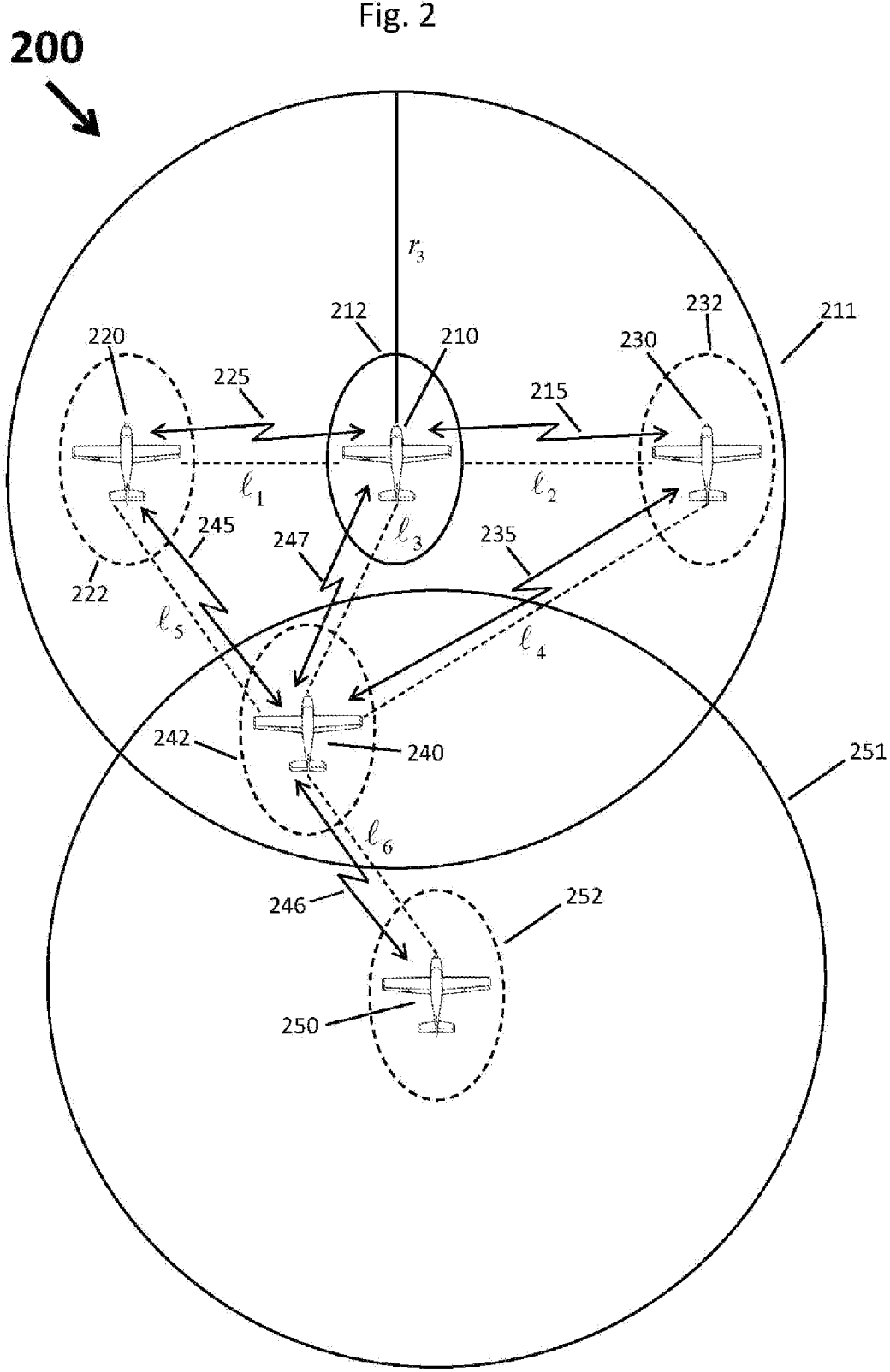
FIG. 2 illustrates the communication region of one drone, and other drones inside that region, communicating with each other.

FIG. 2 illustrates a diagram 200 of a typical operating condition with drones 210, 220, 230, 240, and 250 with their bubble regions marked as 212, 222, 232, 242, and 252 respectively. Drone 210 has a communications sphere marked 211 with radius $r_3$ and it contains other drones 220, 230, and 240. Drone 250 is outside the communications sphere 211. Thus drones 210, 220, 230, and 240 that are within one communication region (in this case region or sphere 211) communicate with each other as shown with 225 representing the communications link between drones 210 and 220, 215 representing the communications link between drones 210 and 230, 235 representing the communications link between drones 230 and 240, 245 representing the communications link between drones 220 and 240, and 247 representing the communications link between drones 210 and 240. Drone 250 communicates with drone 240 that is within its communication region marked 251 using the communications link 246. The distances between drones within a communications sphere or region are measured using sensors or sensing devices on board of each drone, such as sensing device 1415 in FIG. 14. Thus $l_1$ represents the distance between drones 210 and 220, $l_2$ the distance between drones 210 and 230, $l_3$ the distance between drones 210 and 240, $l_4$ the distance between drones 230 and 240, $l_5$ the distance between drones 240 and 220, and $l_6$ the distance between drones 240 and 250. Drone 240 communicates the distance $l_6$ to drones 210, 220, and 230.

Figure 3:
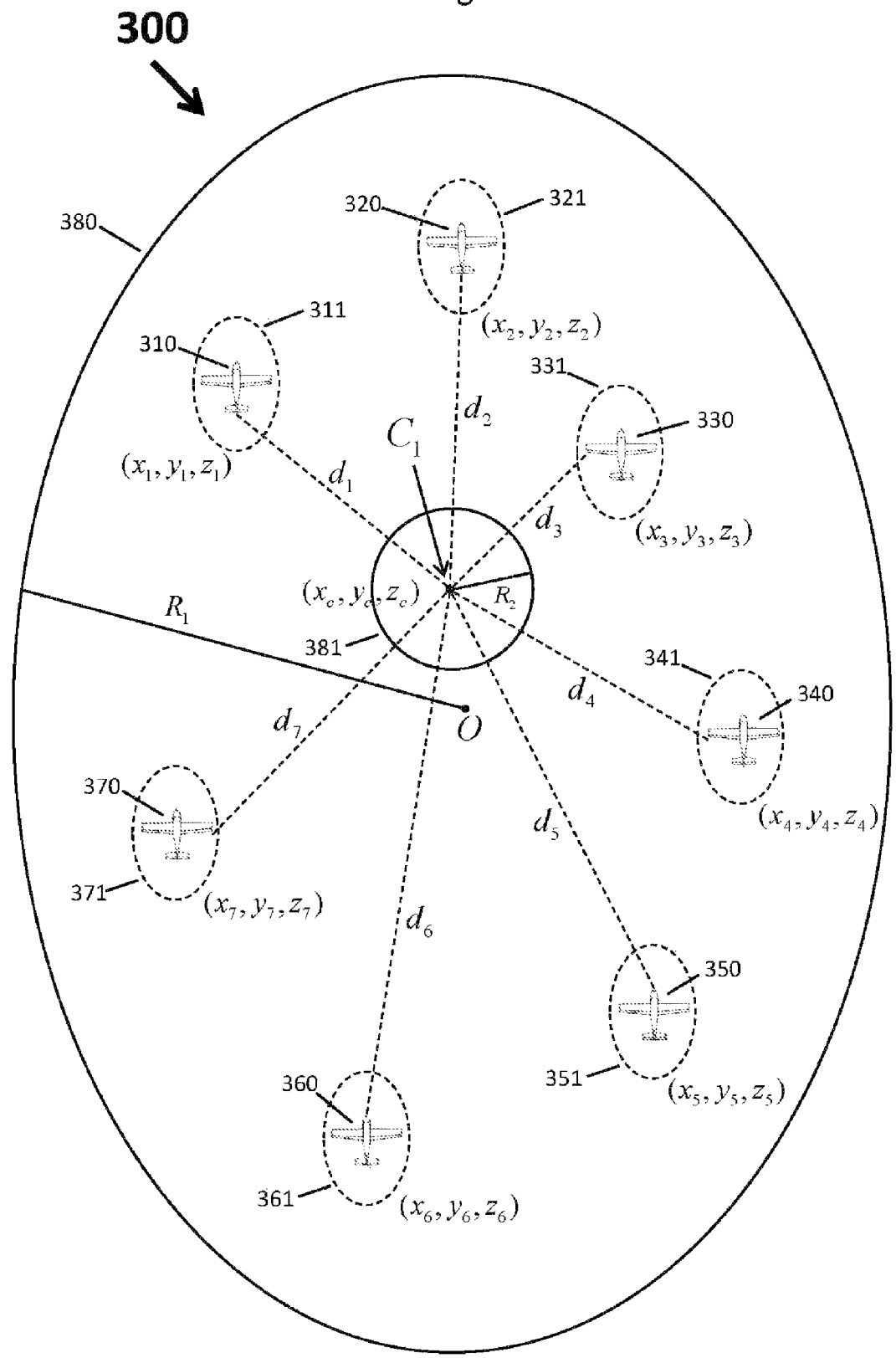
FIG. 3 illustrates a swarm region centered at an origin O with a certain radius and several drones within the swarm region with a group centroid location of the several drones with the swarm region marked along with the radius of an allowed group centroid sphere.

FIG. 3 illustrates a set of decentralized drones marked 310, 320, 330, 340, 350, 360, and 370 within a swarming region marked 380 with center O and radius $R_1$ such as one kilometer. The locations of each of drones (310, 320, 330, 340, 350, 360, and 370) can be self-determined using a GPS (global positioning system) device, such as GPS device 1430 in FIG. 14, and then communicate to other drones in the swarm using communications links of the particular drone and the drones to which the information is communicated. The communication links for a drone may include a transmitter/receiver 1455 shown in FIG. 15 and a corresponding identical or similar transmitter/receiver of another drone. In addition, the drones can measure the distances between them using the sensors on board as described previously. In at least one embodiment, the drones are maintained to be within the swarm sphere region by sensing the distances between each pair of drones in the group and requiring that the distance between any two drones never exceed the diameter of the swarm sphere. Drone 310 location is marked ($x_1$, $y_1$, $z_1$) wherein the three measurements may be Cartesian coordinates with respect to a reference point such as a satellite calculated from their respective latitude, longitude and altitude above sea level that is available from GPS data. Similarly ($x_2$, $y_2$, $z_2$) represents the coordinates of drone 320, ($x_3$, $y_3$, $z_3$) represents the coordinates of drone 330, ($x_4$, $y_4$, $z_4$) represents the coordinates of drone 340, ($x_5$, $y_5$, $z_5$) represents the coordinates of drone 350, ($x_6$, $y_6$, $z_6$) represents the coordinates of drone 360, and ($x_7$, $y_7$, $z_7$) represents the coordinates of drone 370. These coordinates are used to compute a first group or swarm centroid marked $C_1$ of the group of drones (310, 320, 330, 340, 350, 360, and 370) whose coordinates are marked ($x_c$, $y_c$, $z_c$). Then, generally speaking for any number of drones in the swarm sphere 380, in terms of their -Cartesian coordinates:

$$x_c = \frac{1}{L}\sum_{i=1}^{L} x_i, \; y_c = \frac{1}{L}\sum_{i=1}^{L} y_i, \; z_c = \frac{1}{L}\sum_{i=1}^{L} z_i \quad (1)$$

where L represents the total number of drones in the swarm sphere 380. The first group centroid $C_1$ with coordinates ($x_c$, $y_c$, $z_c$) is surrounded by a group centroid sphere 381 with radius $R_2$. If the drone locations are specified using GPS measurements in terms of latitude, longitude and altitude, these readings can be converted by a computer processor, such as host computer processor 1310 of a handheld computer device to an Earth centered or a reference satellite based Cartesian-coordinate system using standard conversion formulas and equation (1) may then be used to compute the group or swarm centroid Cartesian-coordinates that can be finally transformed back in terms of latitude and longitude. The drones 310, 320, 330, 340, 350, 360, and 370 have their inner bubble regions 311, 321, 331, 341, 351, 361, and 371, respectively that are kept free of other drones at all times, by the actions of a computer processor, such as computer processor 1410 for each of the drones 310, 320, 330, 340, 350, 360, and 370. The drones are enabled to move around mostly within the swarm sphere 380 by restricting their latest group centroid computed at any later instant to be within the group centroid sphere 381 that is centered around the first group centroid. This can be also accomplished by computing the distances $d_1$, $d_2$, $d_3$ . . . $d_7$ as marked, that represent the distances between the first group centroid and each of the drones. In this manner the drones 310, 320, 330, 340, 350, 360, and 370 are controlled in a decentralized manner while allowing individual freedom to roam around, provided the inner bubble region of each drone is free of other drones/objects and their overall group centroid at any time moves within the group centroid sphere generated around the first group centroid $C_1$. As mentioned earlier the various drones within the swarm sphere 380 may be communicating across multiple communication spheres. For example drone 320 might communicate with drones 310, 330, and 340 that are within a communication sphere for drone 320. Similarly, drone 340 may communicate with drones 330, 350, 360, and 370 that are within a communication sphere for drone 340. Thus the communications spheres for drone 320 and 340 are different but have some overlap. Because of the overlap of the communications spheres, drone 340 is able to transfer the information being transferred from drones 350, 360, and 370 (in one communications sphere) to drones 310, 320, and 330 (in another communications sphere), and vice-versa. Similarly, drone 370 communicates with drones 310, 340, 350, and 360 and is also able to transfer the information from drones 350 and 360 to drone 310. Thus, in at least one embodiment, all drones within a swarm region effectively communicate with all other drones within the swarm region and know the geographical location and speed of all other drones within the swarm region. The drones are held together loosely as a swarm by requiring the group centroid of the swarm of drones, at any later time instant to be within the group centroid sphere 381 centered on the first group centroid $C_1$, after accounting for any common motion compensation due to the systematic motion of all drones such as moving with a specific velocity towards a specific direction.

Figure 4:
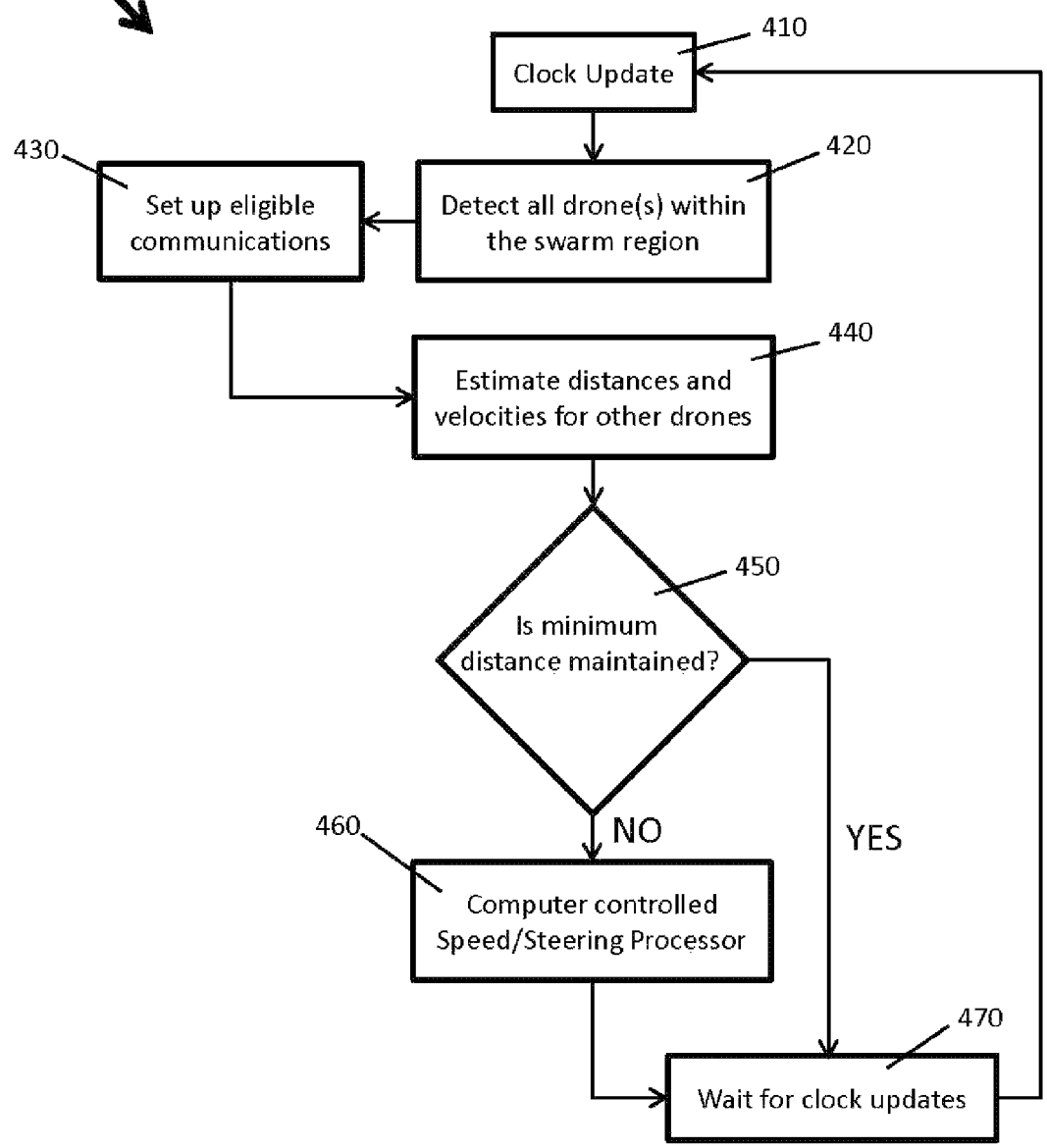
FIG. 4 is a flowchart of a routine or method which can be implemented by a computer processor programmed by computer software, wherein the routine enables the ability to maintain an inner or bubble region around each drone free of other drones.
Figure 14:
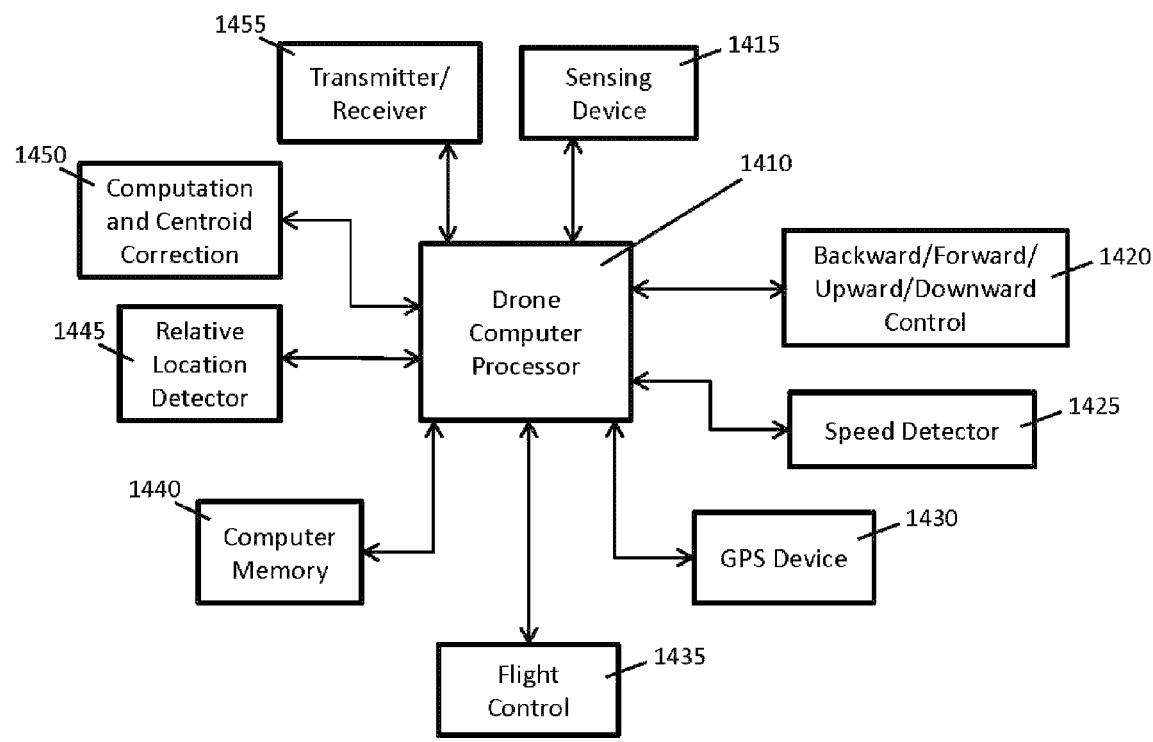
FIG. 14 is a block diagram of a drone computer onboard apparatus in accordance with an embodiment of the present invention, which would be located within a drone.

FIG. 4 shows a flowchart 400 of a method, in accordance with an embodiment of the present invention, which may be implemented by a computer processor, such as 1410 in FIG. 14, as programmed by computer software which may be stored in computer memory 1440, all of which may be located on board any drone previously described in FIGS. 1-3, such as for example drone 310. At step 410, the clock of the computer processor such as 1410 in FIG. 14, in each drone is updated. At step 420 the computer processor 1410 uses the sensing device 1415 to detect all drones within the swarm region, in which this particular drone is located, such as swarm region 380 of FIG. 3, using overlapping communication regions such as 211 and 251 as shown in FIG. 2. In at least one embodiment, the sensing device 1415 may provide measurements or raw data and the computer processor 1410 may be programmed to calculate distances and velocities of each of the other drones, from this raw data at step 440. The distances of the other drones from the current drone and the velocities of the other drones, as well as the current drone, may be stored in computer memory 1440. At step 430, the current drone, such as 310, may transmit information concerning distances, locations, and velocities of other drones or of itself via a transmitter of the transmitter/receiver 1455, to receivers of similar or identical transmitter/receivers of the other drones within its communications range.

At step 450 the computer processor 1410 of the current drone, such as 310, determines if a minimum distance is being maintained from the current drone, such as 310, from all of the other drones (such as 320, 330, 340, 350, 360, and 370) within the swarm region 380. If the minimum distance is maintained then clock updates are waited for at step 470. If the minimum distance is not maintained, meaning another drone is too close to the current drone, then at step 460 the computer processor 1410 causes the flight control 1435 and/or the backward/forward/upward/downward control 1420 to steer or change the speed of the current drone so that it is no longer too close to any other drone, if that is possible. If a drone is surrounded by other drones, then the other drones that are equipped with similar, analagous, or identical computer processors will initiate their own protocols so that they move out of the bubble region of other drones. If there are two or more drones such as 320 in the bubble region of a drone such as 310, the protocol as to which drone initiates the first move can be determined by requiring that the drone such as 320 that encroaches into the territory of another drone such as 310 has the first option to make the move to get out of the bubble region of the drone 310. If the drone 320 does not execute that action, then the drone 310 follows up with the necessary move during the next clock cycle. At step 470 the computer processor 1410 is programmed to wait for clock updates. When it is time for the clock to update, the procedure loops back to step 410.

Figure 5:
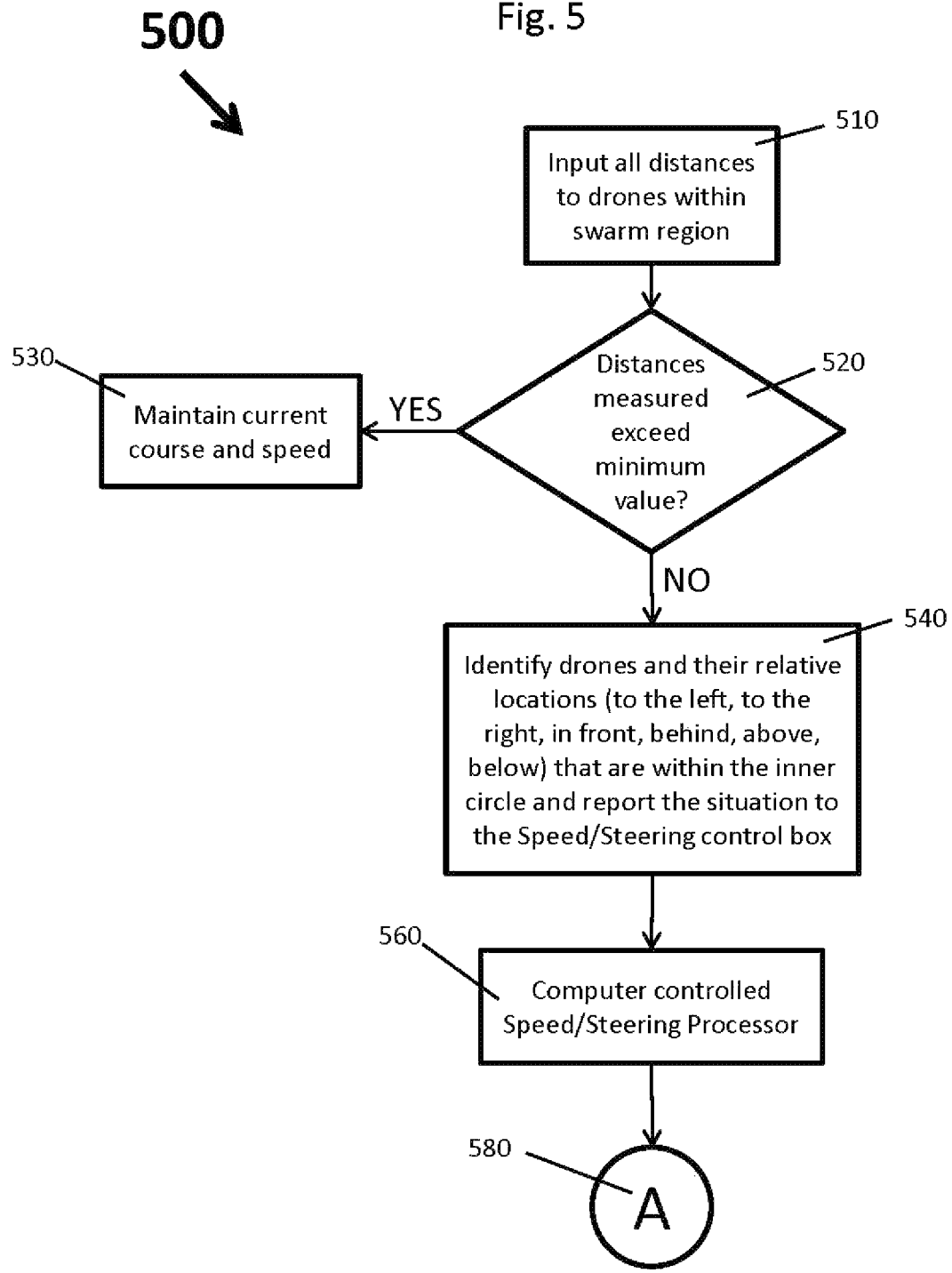
FIG. 5 is a flowchart of a minimum distance from a single drone to other drones control method in accordance with an embodiment of the present invention.
Figure 13:
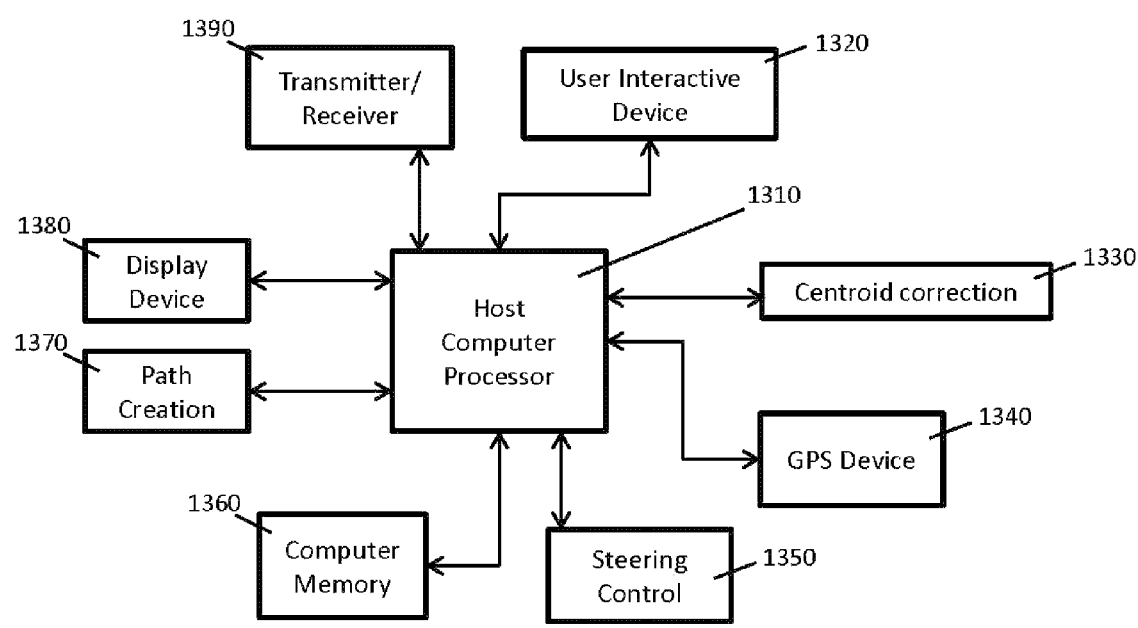
FIG. 13 is a block diagram of a host computer onboard apparatus in accordance with an embodiment of the present invention, which may be located in a handheld device.

FIG. 5 shows a flow chart 500, of a method which may be implemented by the computer processor 1310 of a computer device 1300 shown in FIG. 13, such as a tablet personal computer which may be on the ground and may not be located in a drone. At step 510, the computer processor 1310 may receive inputs regarding all distances between all drones within a swarm region, such as region 380 of FIG. 3. For example, each drone, such as including drone 310, may transmit from the transmitter/receiver 1455 to the transmitter/receiver 1390 distances from that drone, to every other drone in the swarm region 380. The computer processor 1310 may store the distances in computer memory 1360.

At step 520 the computer processor 1310 may determine if each of the distances, from each drone to every other drone in the region 380 exceed a minimum value, wherein the minimum value may be stored in the computer memory 1360. If the answer is yes, the computer processor 1310 does not change the course or speed of any of the drones of the region 380 at step 530. If the answer is no, the computer processor 1310 identifies drones and their relative locations that are within an inner circle of a particular drone, such as inner circle 311 of drone 310, and causes the steering control 1350 to steer one or more of the drones in the region 380 or change speed by using steering control 1350 at step 560. Steering control device 1350 may also control speed of one or more drones, for example, by sending signals from transmitter/receiver 1390 which are received by transmitter/receiver 1455 or analagous of a drone, and then the computer processor 1410 or analagous of the particular drone, controls steering or speed by flight control device 1435 or control 1420. The processor may continue from step 560, to node A, or step 580 from FIG. 5 to FIG. 6.

Figure 6:
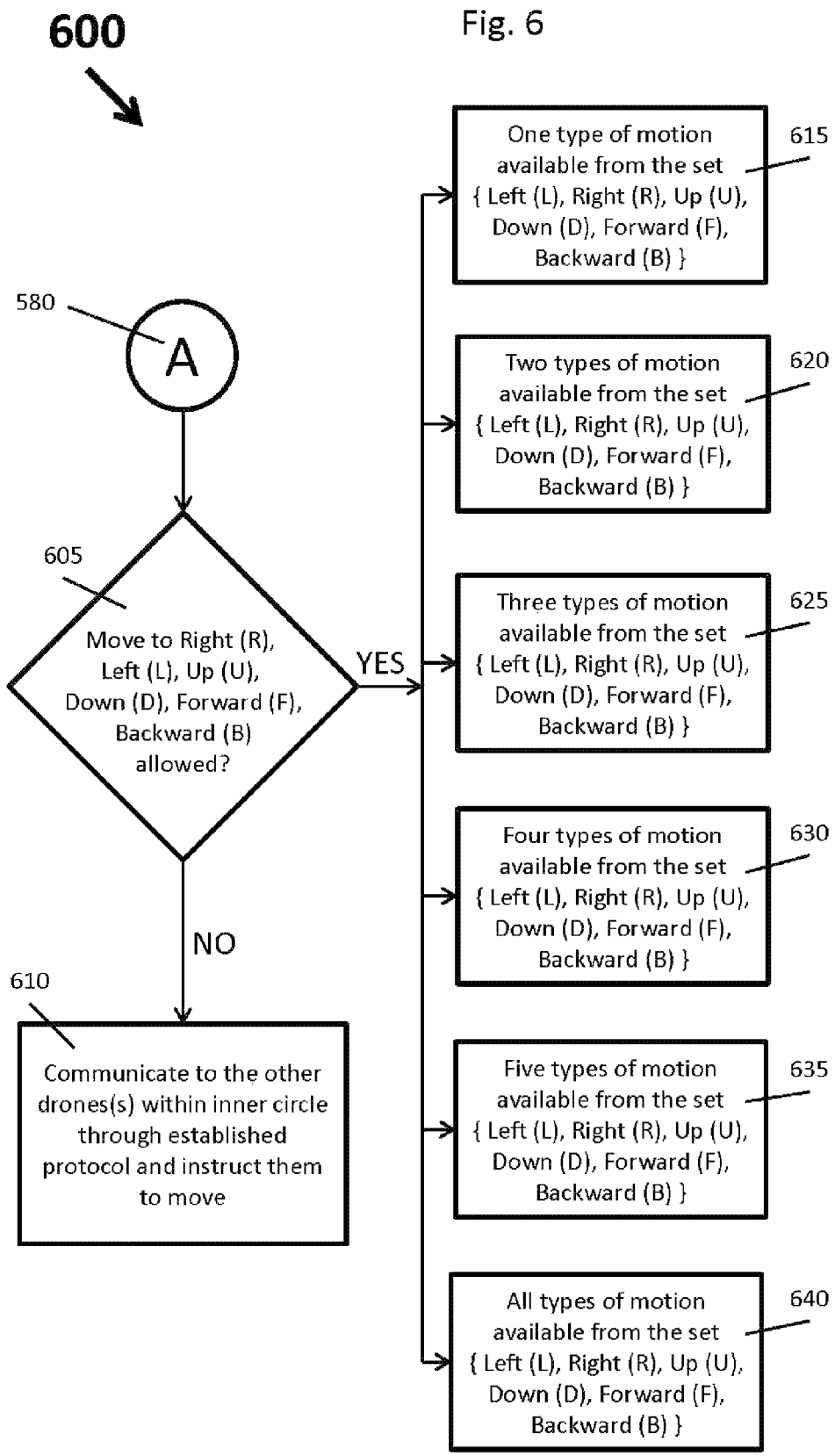
FIG. 6 is a flow chart of a speed/location steering control method for a single drone, which can be implemented by a computer processor programmed by computer software.

FIG. 6 shows a flowchart 600 of a method, continued from FIG. 5, as programmed by computer software, which may be implemented by the computer processor 1410 on a drone, such as drone 310. The method starts at step 580 or node A, which is continued from FIG. 5. Next, at step 605 the computer processor 1410 of a particular drone, determines whether the current drone, such as 310, should be moved right, left, up, down, forward, backward (forward and backwards motion may include speeding up and slowing down). This may be determined by analyzing the location of all of the other drones in a swarm region 380 versus this current drone, such as 310. The computer processor 1410 is programmed to execute either one, two, three, four, five, or all types of motion from the set of left, right, up, down, forward, or backward, at steps 615, 620, 625, 630, 635, or 640, respectively, depending upon which action provides the fastest correction of the current drone following a protocol such as described earlier, such as 310 into a state where no other drone is in its bubble or inner region. The computer processor 1410 may be programmed to predict the courses of each of the six actions (615, 620, 625, 630, 635, and 640) and to predict which one is the best.

If none of the moves shown at step 605 are allowed, then the computer processor 1410 of the current drone, such as 310, transmits one or more signals to the other drones in the swarm region via transmitter/receiver 1390 to the effect that the other drones have to move so that they are not within a minimum distance whose value is stored in computer memory such as 1360 and/or 1440. One or more of the other drones, will receive the signals via a receiver of their transmitter/receivers, similar or identical to 1455 and use their controls, similar or identical to controls 1420 or 1435, to steer themselves or change their speed to cause the distance between the drone 310 and the other drones to be greater than or equal to the minimum distance.

When moves of a drone are made, the moves may be made in increments of a predetermined distance c such as one meter in the following order, or any other order when allowed: (a) move right, (b) move forward, (c) move left, (d) move backward, (e) move up, and (f), move down.

Figure 7:
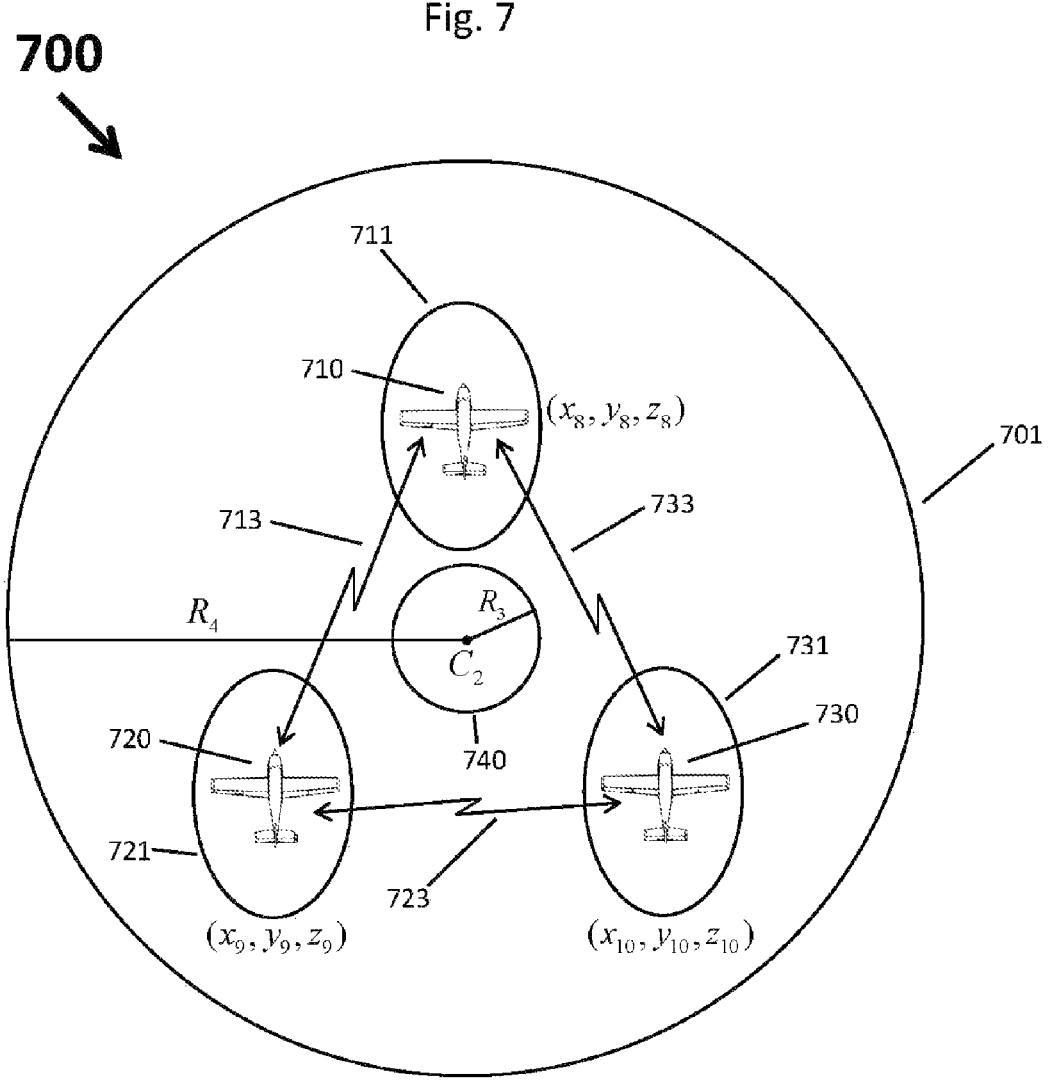
FIG. 7 illustrates several drones in a swarm region with the group centroid of the combination of the several drones marked along with an allowed centroid sphere radius, where each drone is able to directly communicate with every other drone in the swarm.

FIG. 7 shows a diagram marked 700 with drones 710, 720 and 730 forming a triangular swarm configuration inside a swarm region 701 with radius $R_4$. At the instant shown, the drone 710 is located at Cartesian-coordinates $(x_8, y_8, z_8)$, drone 720 is located at $(x_9, y_9, z_9)$, drone 730 is located at $(x_{10}, y_{10}, z_{10})$ so that their group centroid $C_2$ has Cartesian-coordinates $$\left(\frac{x_8 + y_9 + z_{10}}{3}, \frac{x_8 + y_9 + z_{10}}{3}, \frac{x_8 + y_9 + z_{10}}{3}\right) \quad (2)$$

with respect to a suitable reference frame. The group centroid $C_2$ is surrounded by a group centroid sphere 740 having a radius $R_3$. A communications link 713 between drones 710 and 720, a communications link 733 between 710 and 730, and a communications link 723 between drones 720 and 730 are also shown in FIG. 7. The swarm formation shown in FIG. 7, allows individual drones freedom to move around while their bubble regions 711, 721, and 731 are kept free of other drones/objects at all times, and the group centroid computed from their latest position is restricted to be within the group centroid sphere 740.

Figure 8:
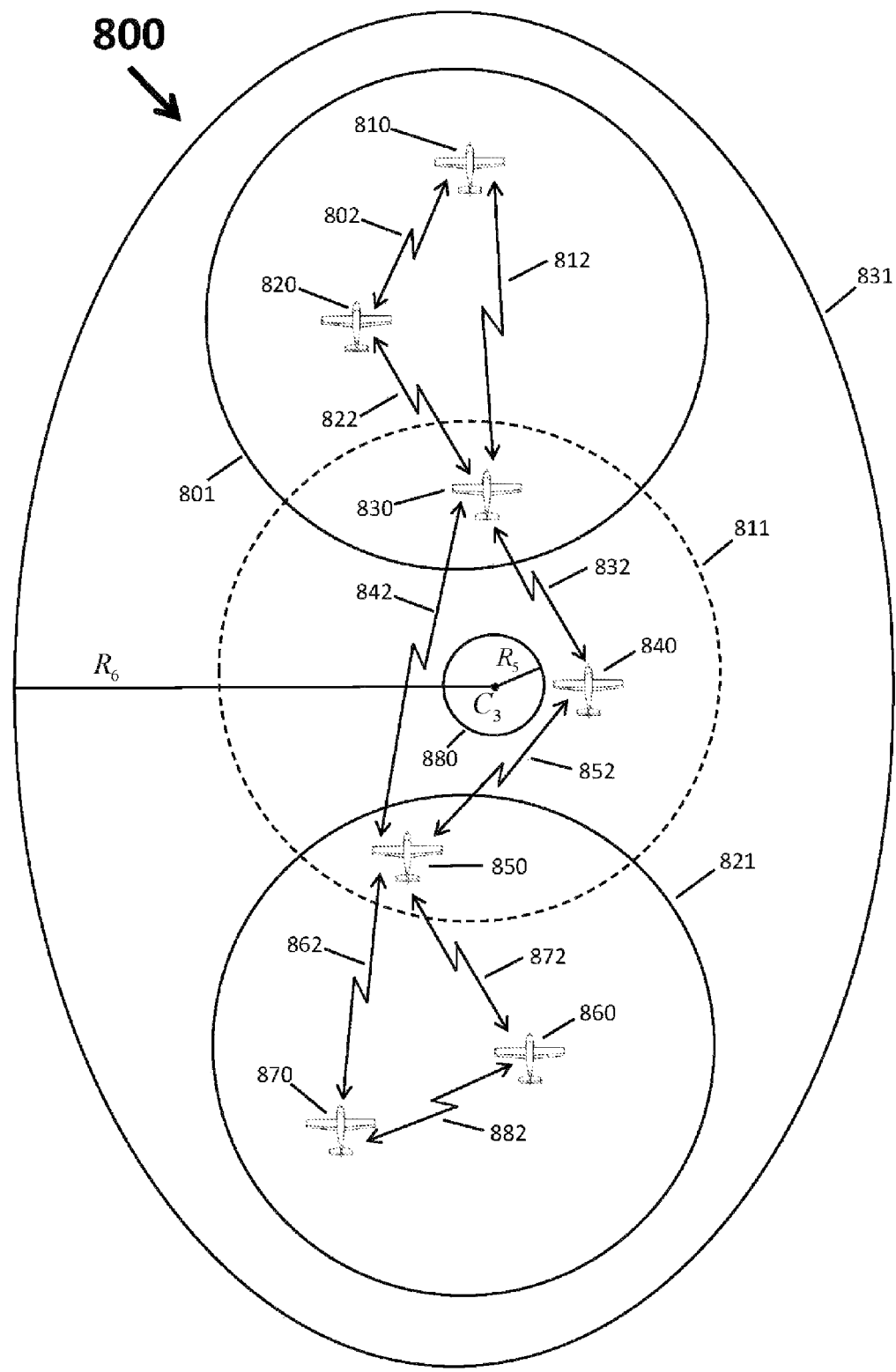
FIG. 8 illustrates a swarm region containing several communication regions, and their overall group centroid marked along with the allowed centroid sphere radius, where each drone in the communication region communicates with every other drone within its smaller swarm region, and communication across different communication regions is achieved through drones that belong to multiple communication regions.

FIG. 8 shows a diagram 800 with a swarm region 831 with radius $R_6$ and three communications regions 801, 811, and 821 within the swarm region 831. The communications region 801 has drones 810, 820, and 830 within it and they all communicate with each other using communications links 802, 812, and 822, respectively. Communications region 811 has drones 830, 840, and 850 within it and they communicate with each other using communications links 832, 842, and 852, respectively. Similarly, communication region 821 contains drones 850, 860 and 870 and they all communicate with each other using links 862, 872, and 882, respectively. Moreover drone 830 belongs to both communication regions 801 and 811, and hence it communicates with drones within region 801 as well as those within region 811. Hence, drone 810 is able to communicate with drone 850 belonging to communication region 811 through the drone 830. Similarly drone 850 belongs to both communication region 811 and 821, and hence it is able to communicate with drones in those two regions. Hence, drone 830 is able to communicate with drone 870 through drone 850. As a result drone 810 in communications region 801 is able to communicate with drone 870 in communication regions 821 through intermediary drones 830 and 850 that are common to different communication regions. In this manner every drone in the swarm region 831 is able to communicate with every other drone in the swarm, either using a direct communications link or using multiple communications links using intermediaries. Thus every drone in the swarm region, such as 831 in FIG. 8, knows all the location and speed information about every other drone in the swarm, for example by having that information provided by another drone. Then location information is used, in at least one embodiment, by the computer processor such as 1450 in each drone to compute a group centroid $C_3$ for the combination of all of the drones 810, 820, 830, 840, 850, 860, and 870 in the swarm region 831. A sphere of radius $R_5$ with center $C_3$ defines the group centroid sphere 880, and the drones 810, 820, 830, 840, 850, 860, and 870 have freedom to move around within the swarm region 831, while protecting their respective inner or bubble regions (not shown in FIG. 8, but analagous to bubble or inner region 120 in FIG. 1), such that the group centroid at any later time instant always stays within the group centroid sphere 880 shown in FIG. 8. If not, corrections to the drone locations are initiated out either by the drone on board computer processors, such as a computer processor 1450 or analagous for each drone, or external monitoring resources such as ground controllers, such as computer processor 1390 of a ground controller or computer, so that the latest group centroid of the swarm of region 831 is within the group centroid sphere 880.

Figure 9:
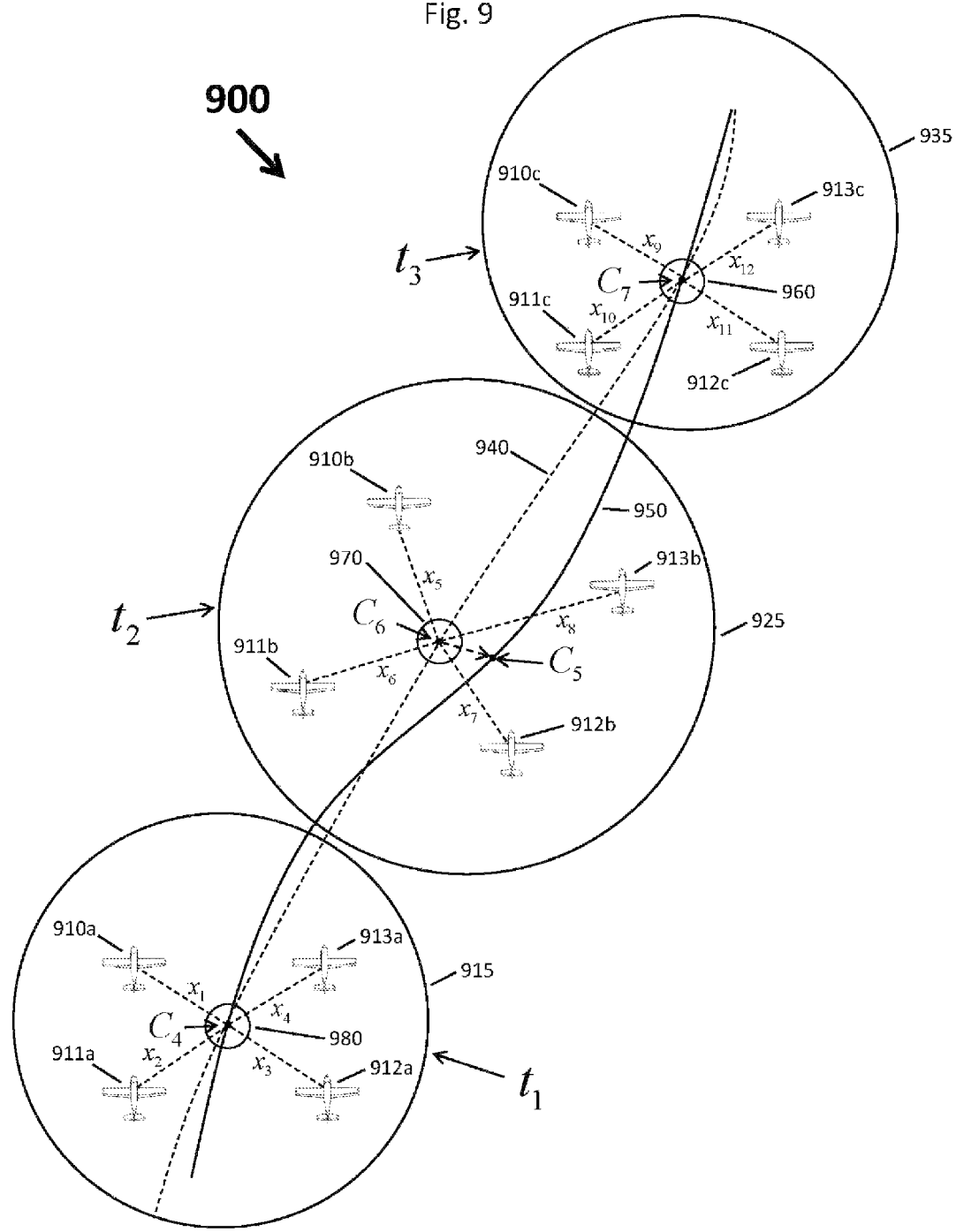
FIG. 9 illustrates a desired path of a swarm and an actual path, where periodic corrections are done to the drones of the swarm to correct the group centroid coordinates of the combination of drones of the swarm to coincide with those of the desired path.

FIG. 9 shows a diagram 900 that depicts a desired path 950 (solid line) and an actual path 940 (dashed line) executed by a swarm group centroid such as 980 marked $C_4$ The desired path 950 may be pre-computed by the host computer processor 1310 using a path creation computer program 1370 which may be stored in the computer memory 1360. Given beginning point and end point coordinates, the path generation program as executed by the computer processor 1310 with the help of preloaded local data maps generates a path that is specified using latitude, longitude, and altitude or Cartesian-coordinates with respect to some well-known reference frame, e.g. the center of the Earth. Points marked $C_4$, $C_5$ and $C_7$ in the desired path 950 illustrate three such points. The swarm represented by four drones 910a, 911a, 912a, and 913a is shown for time instant 4 with associated swarm region 915 and with the first group centroid center coinciding with point $C_4$. The group centroid sphere 980 is also shown. The actual centroid at this time instant $t_1$, happens to coincide with the point marked $C_4$ on the path and hence no path correction is required at the instant $t_1$. As the swarm travels forward, its configuration at time $t_2$ is shown by the swarm region 925. The drones at time $t_2$ are marked 910b, 911b, 912b, and 913b; however drones 910b, 911b, 912b, and 913b are the same drones as 910a, 911a, 912a, and 913a, just at a later time. The actual group centroid—second group centroid marked $C_6$ of the drones 910b, 911b, 912b, and 913b is also shown. Also shown is the second group centroid sphere 970. Notice that the nearest point $C_5$ on the desired path 950 (solid line) is outside the group centroid sphere 970, and hence corrections to positions of drones 910b, 911b, 912b, and 913b need to be initiated using a computer processor, similar or identical to 1450 for one or more of the drones 910b, 911b, 912b, and 913b, to move the second group centroid $C_6$ closer to the nearest point marked $C_5$ on the actual path 950. The effect of such a correction to the group centroid is illustrated at time $t_3$, where swarm region 935 represents the swarm of drones as the swarm moves forward with 910c, 911c, 912c and 914c representing the drones within the swarm region 935. The drones 910c, 911c, 912c, and 913c are the same as the drones 910a, 911a, 912a, and 912a, respectively, but at a different point in time. The group centroid location of the drones 910c, 911c, 912c and 913c coincides with the nearest point marked $C_6$ on the desired path and a centroid sphere 960 is also shown for time $t_3$. Since the actual group centroid and a point $C_6$ on the desired path 950 (solid line) are well within the group centroid sphere 960, no additional correction is required at this instant.

Figure 10:
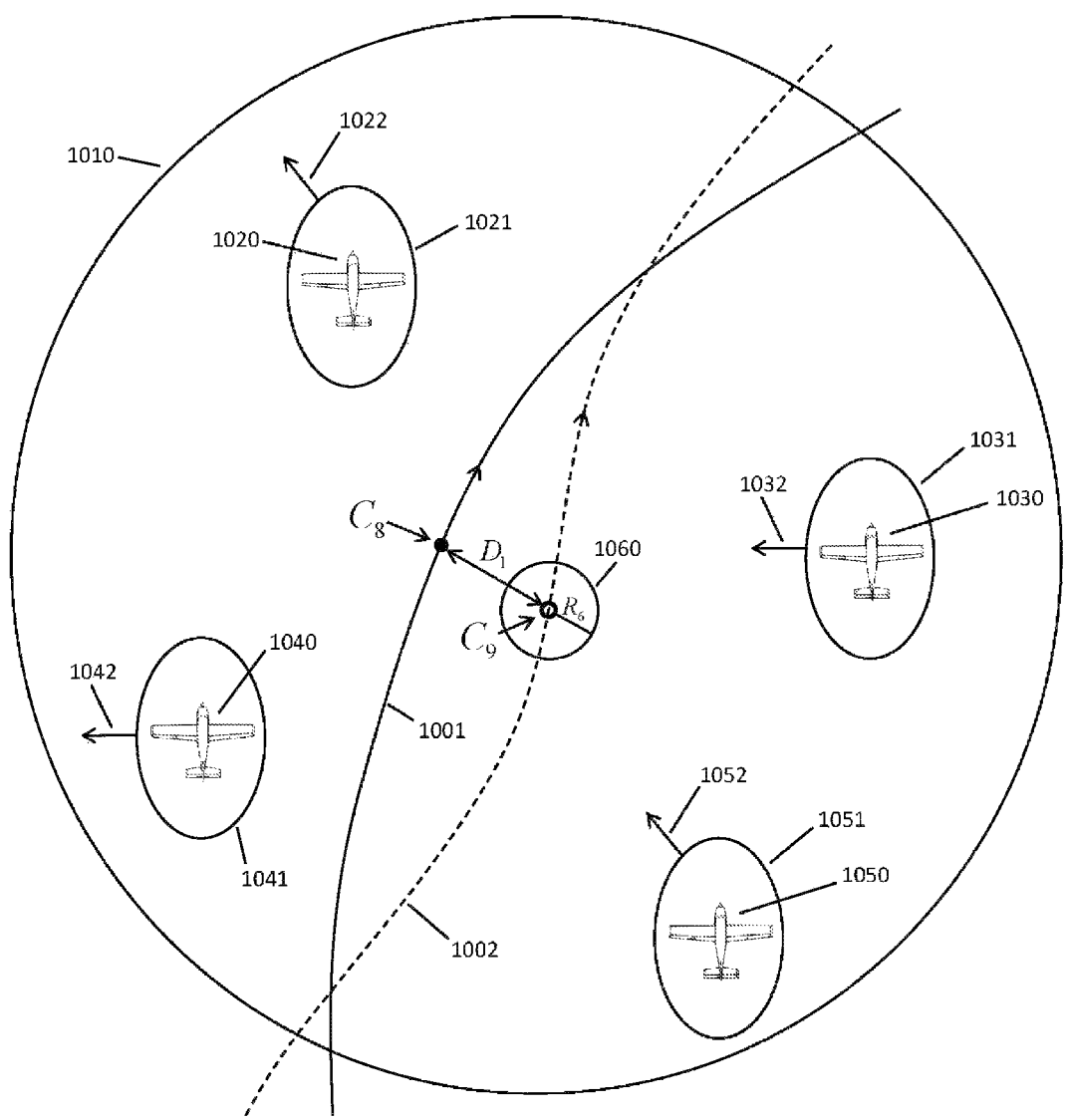
FIG. 10 shows the drones in a swarm, the actual group centroid of the drones in the swarm at some time instant, the desired path (solid line), and the actual path generated by the group centroid (dotted line) along with a point closest to the group centroid that is on the desired path.

FIG. 10 illustrates a diagram 1000 with a swarm region 1010 containing drones 1020, 1030, 1040 and 1050 respectively. Similarly, 1022, 1032, 1042 and 1052 represent the instantaneous velocities of the drones 1020, 1030, 1040 and 1050, respectively. Solid line 1001 shows the desired path for the swarm group centroid, while dotted line 1002 shows the actual path of the swarm group centroid along with the group centroid sphere 1060. The point marked $C_9$ represents the actual group centroid location of the combination of the drones 1020, 1030, 1040 and 1050 computed using their current location coordinates, while point $C_8$ is the nearest point to $C_9$ on the desired path 1001. Since the actual group centroid $C_9$ and its group centroid sphere 1060 does not include the nearest point $C_8$, necessary corrections must be initiated, in at least one embodiment, so that the drones 1020, 1030, 1040, and 1050 reconfigure in such a manner that the centroid sphere 1060 is shifted to include points on the actual path. This is initiated by computing the distance $D_1$ between the points $C_8$ and $C_9$ and making necessary adjustments such that $D_1$ during subsequent clock cycles becomes smaller than the group centroid radius marked $R_6$. These corrections are initiated through the computer processor 1350 on an external host computer (i.e. external to any drone) or a computer processor 1450, or analagous computer processor on one or more of the drones 1020, 1030, 1040, and/or 1050.

Figure 11:
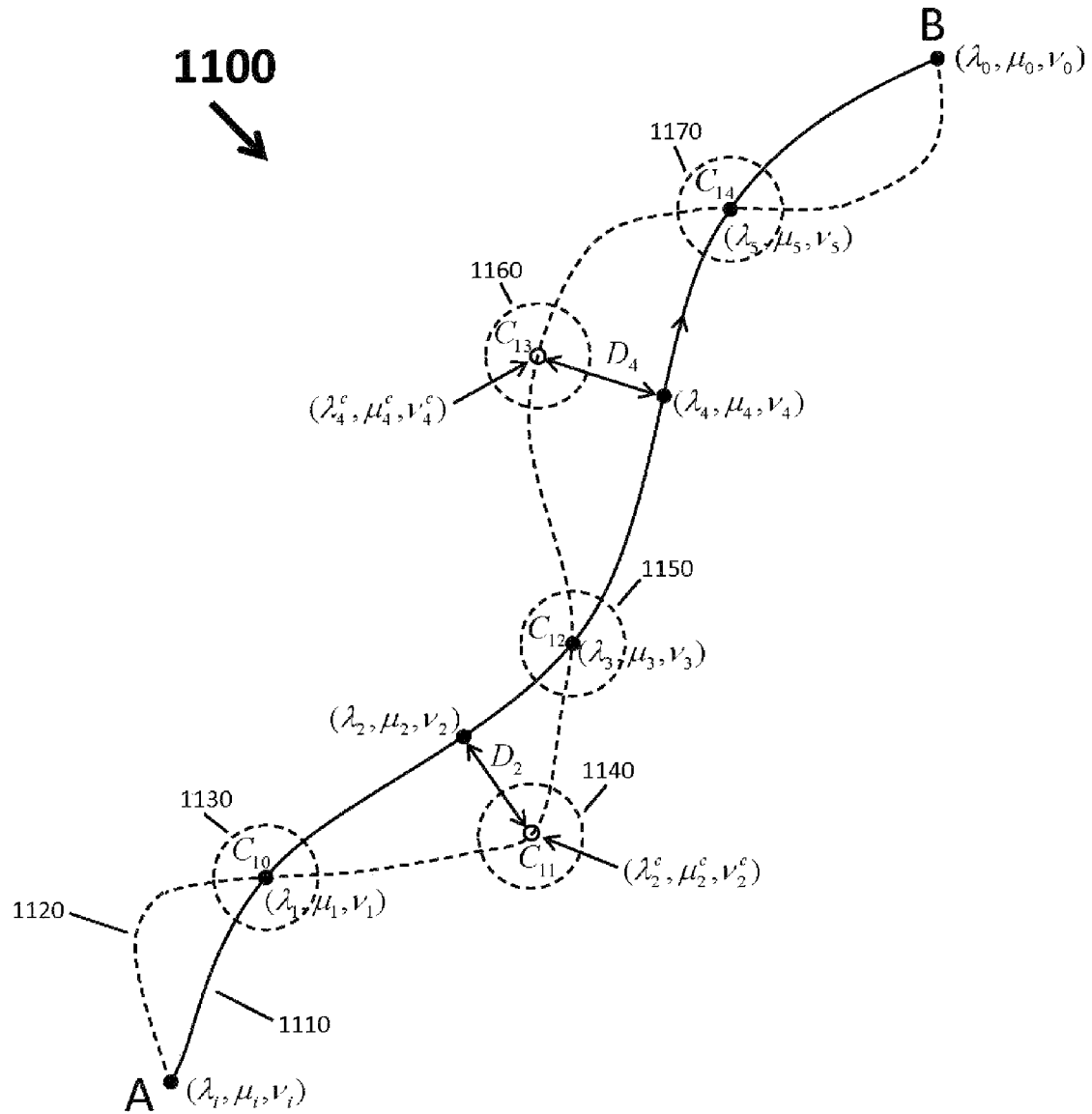
FIG. 11 shows the desired path (solid line) along with the path generated by the group centroid of the swarm (dotted line), where corrections are done to the drones when the two paths do not match so that the group or swarm centroid path gets closer to the desired path.

FIG. 11 shows a diagram 1100 showing a planned path 1110 (solid curve) from point A to point B and an actual path 1120 (dashed curve) along with seven sequential points $(\lambda_i, \mu_i, \nu_i), (\lambda_1, \mu_1, \nu_1), (\lambda_2, \mu_2, \nu_2), (\lambda_3, \mu_3, \nu_3), (\lambda_4, \mu_4, \nu_4), (\lambda_5, \mu_5, \nu_5)$, and $(\lambda_0, \mu_0, \nu_0)$ marked on the planned path 1110. Here $(\lambda_i, \mu_i, \nu_i)$ represents the initial or starting point of the planned path and and $(\lambda_0, \mu_0, \nu_0)$ represents the final or destination point of the planned path. Point $C_{10}$ shows the group centroid of a group of drones in a swarm region, such as of the swarm region 1010 in FIG. 10, at some time instant, and a group centroid sphere 1130 is shown surrounding the centroid $C_{10}$. Since the nearest point $(\lambda_1, \mu_1, \nu_1)$ on the planned path is within the group centroid sphere 1130, no corrections to the drones 1020, 1030, 1040, and 1050 within the swarm region 1010 are required and the swarm of drones moves forward following the pre-loaded path in a computer memory, such as the computer memory 1360 of a computer device external to the drones or in one or more of the computer memories of the drones (such as computer memory 1440 or analagous computer memories). Point marked $C_{11}$ shows the actual group centroid at a later time instant along with a corresponding group centroid sphere 1140. Since the group centroid sphere does not encompass the desired or planned path 1110, corrections to the drone locations are necessary so that the group centroid $C_{11}$ moves closer to its nearest point $(\lambda_2, \mu_2, \nu_2)$ on the desired path 1110 by minimizing the physical distance marked $D_2$ between these two points so that it becomes less than the group centroid radius such as $R_6$. Point $C_{12}$ shows the group centroid of the swarm of drones at a later point in time along with the new group centroid sphere 1150. Since the nearest point ($\lambda_3$, $\mu_3$, $\nu_3$) on the actual 1120 path is within group centroid sphere 1150 no correction to the location of the drones is required. Point $C_{13}$ shows a new group centroid of the swarm at a later time instant along with a group centroid sphere 1160. Since the nearest point ($\lambda_4$, $\mu_4$, $\nu_4$) on the desired path 1110 is outside the group centroid sphere 1160, corrections to the drones are required to minimize the physical distance marked $D_4$ to be less than the group centroid radius such as $R_6$ thereby moving $C_{13}$ closer to point ($\lambda_4$, $\mu_4$, $\nu_4$) that is on the desired path 1110. This protocol is executed using a computer processor 1410 or analagous computer processor of one or more drones, and/or computer processor 1330 of a computer device not on board a drone. Point $C_{14}$ shows the group centroid location of the swarm at yet another later time instant along with a corresponding group centroid sphere 1170. Since the nearest point ($\lambda_5$, $\mu_5$, $\nu_5$) on the desired path 1110 is within the group centroid sphere 1170, no additional corrections are required to the drone locations. In this manner the drones in the swarm follow a desired path starting at the initial position marked ($\lambda_i$, $\mu_i$, $\nu_i$) and completes a mission by finally arriving at the destination point marked ($\lambda_0$, $\mu_0$, $\nu_0$).

Figure 12:
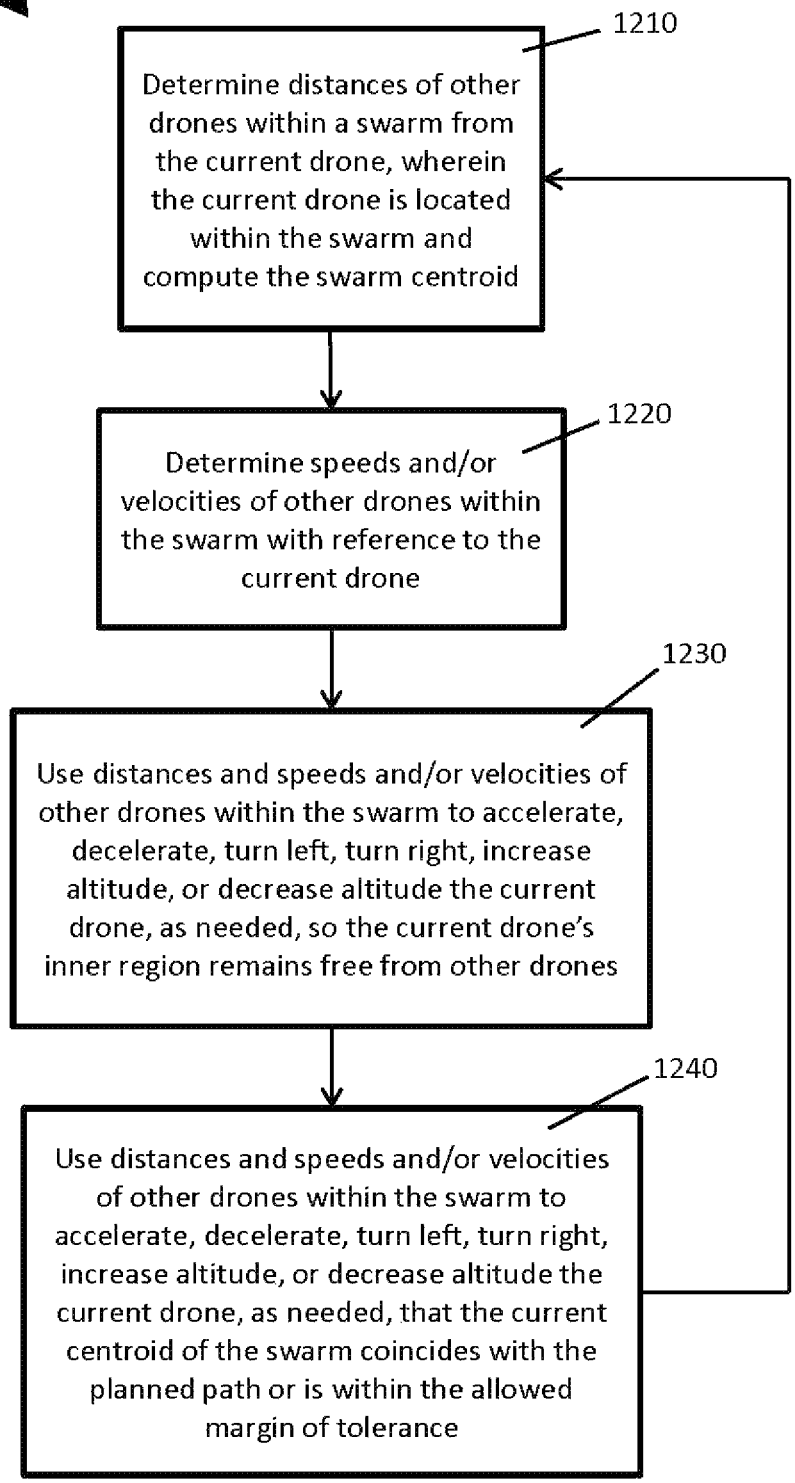
FIG. 12 is a flow chart of a routine or method implemented by a computer processor programmed by computer software where the routine enables an individual drone to keep its inner bubble regions free of other drones, and help keep the group or swarm centroid of the swarm of drones close to the desired path (along with actions of the other individual drones in the swarm).

FIG. 12 is a flow chart 1200 of a routine or method implemented by a computer processor, such as computer processor 1410 onboard a drone, programmed by computer software where the routine enables an individual drone to keep its inner regions free of other drones, and help keep a group centroid of a swarm of drones close to a desired path, such as desired path 1110 in FIG. 11 (along with actions of the other individual drones in the swarm). At step 1210 the computer processor 1410 may determine distances of other drones within a swarm, from the current drone, wherein the current drone is located within the swarm and may also compute the swarm group centroid. The computer processor 1410 may use raw data from one or more of the sensing device 1415, from the relative location detector 1445, from the speed detector 1425, from the global positioning system (GPS) device 1430, and/or from the transmitter/receiver 1455 to determine distances of other drones from the current drone. The computer processor 1410 may use formulas or or information stored in computer memory 1440 in conjunction with raw data to determine distances of other drones from the current drone. The computer processor 1410 may store the distances of other drones from the current drone in the computer memory 1440.

At step 1220, the computer processor 1410 may determine speeds and/or velocities of drones other than the current drone within the swarm with reference to the current drone. The computer processor may use data from any one or more of devices 1415, 1445, 1425, 1430, 1455, and/or the computer memory 1440 to determine speeds and/or velocities of other drones with reference to the current drone. The speeds and velocities may be stored in the computer memory 1440. At step 1230, the computer processor 1410 may use distances, speeds, and/or velocities of other drones within the swarm to steer or change speed of the current drone so the current drone's inner or bubble region remains free of other drones. For example, the computer processor 1410 may cause acceleration or deceleration of the current drone through flight control 1435, or may cause steering backward/forward/upward/downward through control 1420 as appropriate. The computer processor 1410 may also cause turning left or right or increasing or decreasing altitude through one or more of control 1435 and 1420.

At step 1240, the computer processor 1410 may use distances, speeds, and/or velocities of other drones within a swarm to accelerate, decelerate, turn left, turn right, increase altitude, or decrease altitude of the current drone as needed so that a group centroid at a particular time instant of a swarm of drones (which includes the current drone) coincides with a planned path, such as 1110 in FIG. 11 or is within an allowed margin of tolerance. The margin of tolerance will depend on the type of drones and their speed, and can be several meters. The margin of tolerance may be specified by a user and may stored in computer memory such as 1360 and/or computer memory 1440.

FIG. 13 shows a block diagram of a host computer onboard apparatus 1300 in accordance with an embodiment of the present invention, which may be located in a handheld device, such as a handheld personal computer device or tablet computer. The apparatus 1300 may be located external to and not onboard any drone. The apparatus 1300 may be a ground based apparatus. The apparatus 1300 includes host computer processor 1310, user interactive device 1320, centroid correction module 1330, global positioning system (GPS) device 1340, steering control 1350, computer memory 1360, path creation 1370, display device or computer monitor 1380, and transmitter/receiver 1390. The user interactive device 1320 may include a computer mouse, a computer keyboard, and/or a computer touchscreen monitor, for example.

Figure 15:
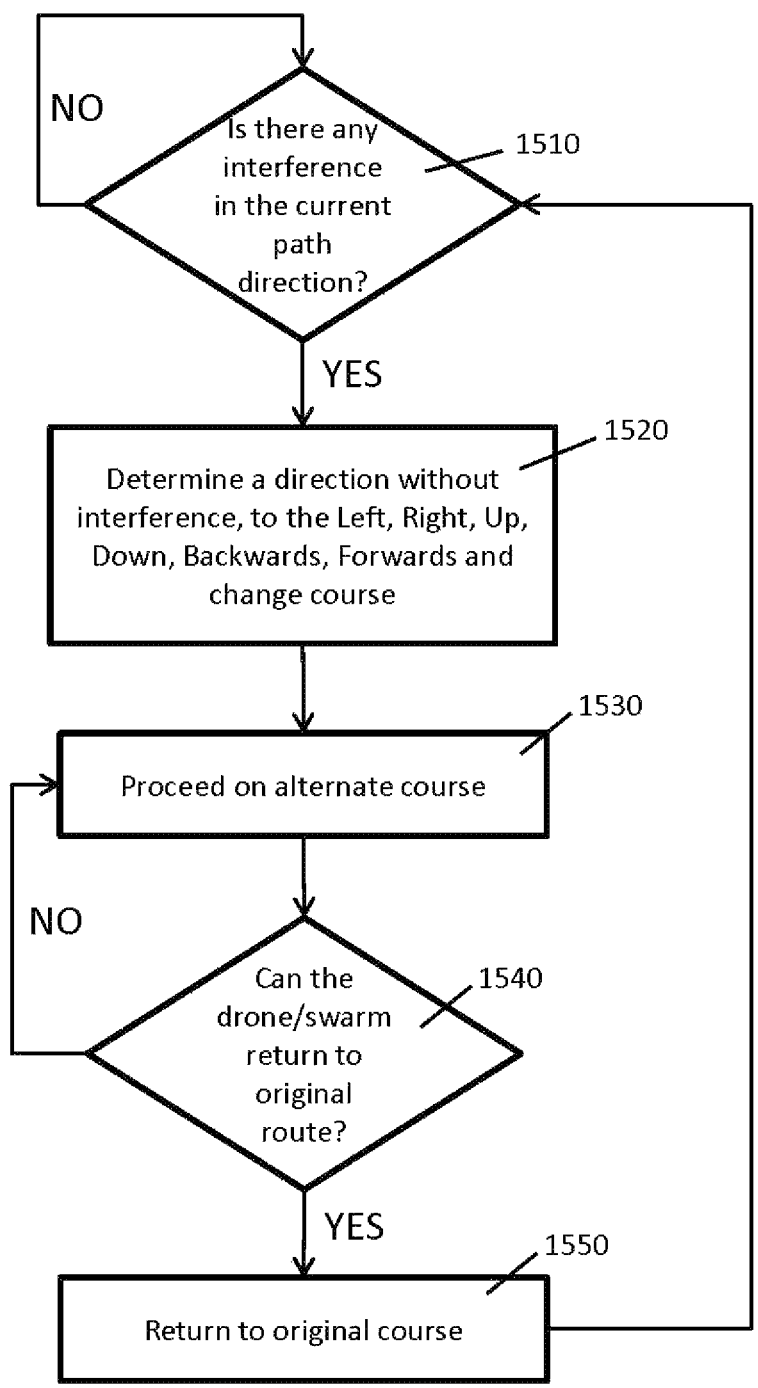
FIG. 15 is a flowchart of a method for obstruction avoidance in accordance with an embodiment of the present invention.

FIG. 14 shows a block diagram of a drone computer onboard apparatus 1400 in accordance with an embodiment of the present invention, which would typically be located within or onboard a drone, such as drone 1020 in FIG. 10. The apparatus 1400 includes drone computer processor 1410, sensing device 1415, backward/forward/upward/downward control 1420, speed detector 1425, GPS device 1430, flight control 1435, computer memory 1440, relative location detector 1445, computation and centroid correction 1450, and transmitter/receiver 1455. The sensing device 1415 may include a radar sensing device or other sensors such as infrared (IR) directional sensors, optical and/or night vision camera, light emitting radar and magnetometers. FIG. 15 is a flowchart of a method for obstruction avoidance in accordance with an embodiment of the present invention, which may be executed by the computer processor 1410 or analagous computer processor of one or more drones or may be executed by the computer processor 1310 of an external or ground based computer device. At step 1510, the computer processor 1310 or 1410 determines if there is any interference in the current path direction, such as 1002 (dashed line) of a group centroid, such as $C_9$, of a swarm of drones, such as the swarm of drones including drones 1020, 1030, 1040, and 1050 shown in FIG. 10. If there is no interference the procedure loops back to step 1510 and checks again for interference. If there is interference, then at step 1520, a direction is determined without interference by the computer processor 1310 or 1410. The computer processor 1310 or 1410 may change the direction of the group centroid to the left, right, up, down, backwards, and/or forwards by changing the course and/or speeds of individual drones within the swarm.

At step 1530 the group centroid proceeds on an alternate course as instructed by the computer processor 1310 and/or one or more of computer processor 1410 and analagous computer processors. At step 1540, the computer processor 1310 and/or computer processor 1410 and/or analagous computer processors determine whether the group centroid of the swarm can return to its original route. If the answer is yes then the swarm should return to its original course at step 1550.

Figure 16:
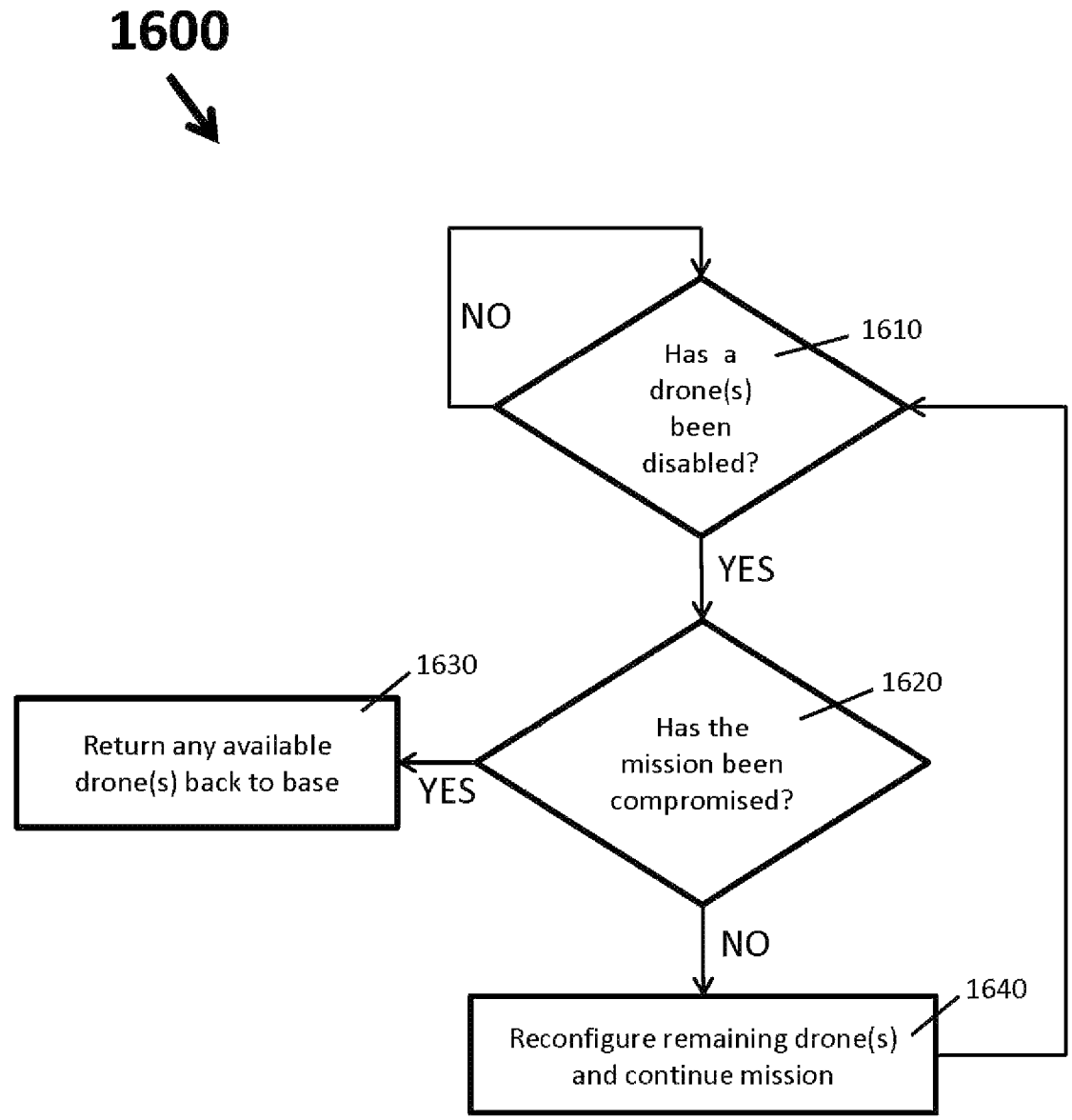
FIG. 16 is a flowchart of a method to return all drones to a base station in accordance with an embodiment of the present invention.

FIG. 16 is a flowchart 1600 of a method to return all drones to a base station in accordance with an embodiment of the present invention, which may be executed by one or more of the computer processor 1310, the computer processor 1410, and/or computer processors analagous to the computer processor 1410. At step 1610, a computer processor (such as 1310, 1410, and/or analagous) determines if a drone has been disabled. If the answer is no, then the procedure loops back to step 1610. If the answer is yes, then at step 1620 the particular computer processor determines if the mission has been compromised. If the answer is yes, then at step 1630, all available drones are ordered to return to a home base, such as a home ground base. This can be accomplished, for example, by transmitting a signal from transmitter/receiver 1390 of FIG. 13 to transmitter/receiver 1455, which causes computer processor 1410 to control flight control 1435, and/or control 1420 to cause a particular drone to return to a home base at a particular geographic location. Analagous signals may be sent to analagous transmitter/receivers on all other drones so that analagous computer processors (similar or identical to 1410) may reconfigure the other drones.

If a mission has not been compromised at step 1640, then the remaining drones may be reconfigured and mission may be continued at step 1640. The remaining drones may be reconfigured by transmitting a signal from transmitter/receiver 1390 of FIG. 13 to transmitter/receiver 1455, which causes computer processor 1410 to do what transmit and receive data from the other drones or from a ground based personal computer, which may be for example apparatus 1300. Analagous signals may be sent to analagous transmitter/receivers on all other drones so that analagous computer processors (similar or identical to 1410) may reconfigure the other drones. Thereafter the procedure may repeat step 1610 and once again determine if a drone has been disabled.

Drug smuggling and similar issues have become an increasing problem for the United States Border patrol. In one or more embodiments of the present invention, as described with reference to one or more of FIGS. 1-16, an apparatus and a method is provided which can be used to combat these issues. Using several drones that are part of a swarm, United States Border Patrol can effectively survey large regions of land and sea twenty-four hours a day, seven days a week, on a three hundred sixty five day basis with little human interaction or danger to law enforcement officials. The drones may move out from a coastal base station and form a swarm, as described earlier, establishing a group centroid. In one or more embodiments, the group centroid is defined as a geometric center of a collection of points, wherein the collection of points includes or consists of a first point associated with a first unmanned aerial vehicle, and a plurality of further points, one associated with each of a plurality of second unmanned aerial vehicles, wherein the first unmanned aerial vehicle and the plurality of second unmanned aerial vehicles make up a group or swarm of unmanned aerial vehicles.

The group or swarm of unmanned aerial vehicles may fly out towards the center of a geographic region to be monitored establishing the first predetermined location, and this first predetermined location may have been translated or may be translated into GPS (global positioning system) coordinates, at which point the swarm radius may be allowed to increase, in at least one embodiment, so that the drones can move out laterally while maintaining the location of their group centriod within a group centriod sphere, whose center is the first predetermined location and whose radius is a tolerance distance. This allows the drones to perform surveillance over nonoverlapping regions while maintaining their group centriod to be within the tolerance distance third distance of a first predetermined location.

Each swarm member, drone, or unmanned aerial vehicle (UAV), in at least one embodiment, may be programmed, such as by programming computer processor 1410 and/or computer memory 1440 to fly over specified geographic regions to survey out of a large area. Each UAV may be programmed to search a particular geographic region for suspicious behavior while reporting their findings back to a home base, such as via transmitter/receiver 1455. In at least one embodiment, the UAVs may be cycled in and out throughout the period of patrol if one loses power unexpectedly, or malfunctions, to maintain close to twenty-four hour a day, seven day a week surveillance. The same concept can be adopted to enforce routine border patrol operations, future no-fly-zone regulations without putting United States troops in harms way. In a similar manner, future wars can be fought as well, whereby United States troops are not in direct combat and supervise the war from safer locations, wherein the war is being fought by weaponized swarms of UAVs.

We claim:

1. A method comprising controlling a flight of a first unmanned aerial vehicle and controlling a flight of a plurality of second unmanned aerial vehicles;

wherein the flight of the first unmanned aerial vehicle and the flight of the plurality of second unmanned aerial vehicles are controlled so that each of the first unmanned aerial vehicle and the plurality of second unmanned aerial vehicles is kept at least a first distance away from any other of the first unmanned aerial vehicle and the plurality of second unmanned aerial vehicles;

and wherein the flight of the first unmanned aerial vehicle and the flight of the plurality of second unmanned aerial vehicles are controlled so that each of the first unmanned aerial vehicle and the plurality of second unmanned aerial vehicles is kept less than a second distance away from any other of the first unmanned aerial vehicle and the plurality of second unmanned aerial vehicles;

wherein the first unmanned aerial vehicle and the plurality of second unmanned aerial vehicles together have a group centroid whose location varies with time as the first unmanned aerial vehicle and the plurality of second unmanned aerial vehicles move over time;

wherein the group centroid is a geometric center of a collection of points including a first point associated with the first unmanned aerial vehicle, and a plurality of further points, one associated with each of the plurality of second unmanned aerial vehicles;

and further comprising determining a first location of the group centroid at a first instant in time; and determining if the first location of the group centroid is within a tolerance distance of a first predetermined location.

2. The method of claim 1 wherein the flight of the first unmanned aerial vehicle is controlled by controlling a direction in which the first unmanned aerial vehicle travels; and the flight of each of the plurality of second unmanned aerial vehicles is controlled by controlling a direction in which each of the plurality of second unmanned aerial vehicles travels.

3. The method of claim 1 wherein the flight of the first unmanned aerial vehicle is controlled by controlling a speed at which the first unmanned aerial vehicle travels; and the flight of each of the plurality of second unmanned aerial vehicles is controlled by controlling a speed at which each of the plurality of second unmanned aerial vehicles travels.

4. The method of claim 1 further comprising if the first location of the group centroid is not within the tolerance distance of the first predetermined location, controlling the flight of one or more of the first unmanned aerial vehicle and the plurality of second unmanned aerial vehicles so that a second location of the group centroid at a second instant in time is within the tolerance distance of the first predetermined location or a second predetermined location.

5. The method of claim 4 wherein the first predetermined location and the second predetermined location are located on a desired path;

and wherein the difference between the first instant of time and the second instant of time is a clock cycle time period;

and further comprising, determining, at least once for every clock cycle time period, for a plurality of clock cycle time periods, whether the group centroid is within the tolerance distance of the desired path.

6. The method of claim 5 further comprising if the group centroid is not within the tolerance distance of the desired path during a current clock cycle time period, controlling the flight of one or more of the first unmanned aerial vehicle and the plurality of second unmanned aerial vehicles so that the group centroid is within the tolerance distance of the desired path during a subsequent clock cycle time period occurring after the current clock cycle time period.

7. The method of claim 1 further comprising and wherein after the flight of the first unmanned aerial vehicle and the flight of the plurality of second unmanned aerial vehicles are controlled for a first period of time so that each of the first unmanned aerial vehicle and the plurality of second unmanned aerial vehicles is kept less than a second distance away from each of the other of the first unmanned aerial vehicle and the plurality of second unmanned aerial vehicles, the flight of the first unmanned aerial vehicle and the flight of the plurality of second unmanned aerial vehicles are controlled for a second period of time, following the first period of time, so that each of the first unmanned aerial vehicle and the plurality of second unmanned aerial vehicles is allowed to be more than the second distance away and is kept less than a third distance away from each of the other of the first unmanned aerial vehicle and the plurality of second unmanned aerial vehicles; and wherein the third distance is greater than the second distance.

8. The method of claim 7 further comprising determining a second location of the group centroid at a second instant of time during the second period of time; and determining if the second location of the group centroid is within the tolerance distance of a second predetermined location.

* * * * *